United States Patent
Earle et al.

(10) Patent No.: US 7,516,137 B1
(45) Date of Patent: Apr. 7, 2009

(54) SYSTEM AND METHOD FOR DYNAMIC MANAGEMENT OF BUSINESS PROCESSES

(75) Inventors: Gordon Earle, Sharon, MA (US); John Bastow, Boston, MA (US)

(73) Assignee: Arrayworks Inc., Braintree, MA (US)

( * ) Notice: Subject to any disclaimer, the term of this patent is extended or adjusted under 35 U.S.C. 154(b) by 1155 days.

(21) Appl. No.: 09/814,315

(22) Filed: Mar. 21, 2001

Related U.S. Application Data

(60) Provisional application No. 60/191,320, filed on Mar. 21, 2000.

(51) Int. Cl.
 *G06F 7/00* (2006.01)
 *G06F 17/30* (2006.01)
 *G06F 17/50* (2006.01)
 *G06F 9/44* (2006.01)

(52) U.S. Cl. .............................. 707/100; 707/10; 705/7

(58) Field of Classification Search ...................... 705/1, 705/35, 8, 5, 30; 707/100, 3, 101, 10, 7
See application file for complete search history.

(56) References Cited

U.S. PATENT DOCUMENTS

| | | | | |
|---|---|---|---|---|
| 5,301,320 | A * | 4/1994 | McAtee et al. ................. | 705/9 |
| 5,737,726 | A | 4/1998 | Cameron et al. ............... | 705/7 |
| 5,831,611 | A | 11/1998 | Kennedy et al. ............ | 345/335 |
| 6,032,124 | A * | 2/2000 | Saito et al. ..................... | 705/9 |
| 6,044,368 | A | 3/2000 | Powers .......................... | 707/2 |
| 6,073,109 | A * | 6/2000 | Flores et al. ................... | 705/8 |
| 6,092,083 | A | 7/2000 | Brodersen et al. .......... | 707/201 |
| 6,141,658 | A | 10/2000 | Mehr et al. .................... | 707/7 |
| 6,523,027 | B1 * | 2/2003 | Underwood ................... | 707/4 |
| 2001/0011295 | A1 * | 8/2001 | Kobayashi et al. .......... | 709/201 |
| 2002/0049603 | A1 * | 4/2002 | Mehra et al. .................. | 705/1 |
| 2002/0103660 | A1 * | 8/2002 | Cramon et al. ................ | 705/1 |
| 2003/0083947 | A1 * | 5/2003 | Hoffman et al. ............. | 705/22 |
| 2003/0187670 | A1 * | 10/2003 | Hassinger et al. ............. | 705/1 |

OTHER PUBLICATIONS

OraAPP: Oracle® Applications Concepts, Release 11 for UNIX, 1998, Oracle®.*

OraSAM: Oracle® Sales and Marketing Connected Client User's Guide, Release 11, Mar. 1988, Oracle®.*

Oracle® Inventory Technical Reference Manual, Release 11i, Dec. 1999, Oracle®.*

(Continued)

*Primary Examiner*—Kuen S Lu
(74) *Attorney, Agent, or Firm*—Mintz, Levin, Cohn, Ferris, Glovsky and Popeo, P.C.

(57) ABSTRACT

A computerized system is provided for modeling a business process, the computerized system comprising a web server and a database server. The web server implements a user interface to the system. The database server is in operable communication with the web server and comprises a data architecture representing the business process. The data architecture comprises an entity model representing an entity responsible for implementing at least a portion of the business process, a transaction model comprising at least one step defining a business process, a list model representing at least one step in the transaction, the list model comprising a list of at least one entity associated with the transaction; and a task model associated with the list, the task model defining at least one task associated with the at least one step in the transaction.

11 Claims, 28 Drawing Sheets

OTHER PUBLICATIONS

Oracle® Applications Concepts, Release 11 for UNIX, 1998, Oracle®.*

Oracle® Sales and Marketing Connected Client User's Guide, Release 11, Mar. 1988, Oracle®.*

The Workflow Management Coalition Specification: The Workflow Reference Model, Jan. 19, 1995, Workflow Management Coalition, Hampshire, UK.*

* cited by examiner

One data record

| FIELD NAME | VALUE | | Possible Values |
|---|---|---|---|
| Name | Stewart Little | | Lead |
| Address | Cheesetown, NC 44455 | | Suspect |
| Telephone | 111-222-3333 | | Prospect |
| Sales status | Suspect | | Hot |
| | | | Customer |

PRIOR ART
FIG. 1

| Name | Source of lead | Enjoys Sports | Enjoys Ballet | Smokes Cigars | Sales Cycle Status |
|---|---|---|---|---|---|
| Alice | Web | Yes | Yes | Yes | Suspect |
| Bobby | Call in | No | No | No | Lead |
| Joe | Direct Mail | Yes | No | No | Suspect |
| John | Web | No | Yes | Yes | Prospect |
| Mark | Direct Mail | No | No | Yes | Lead |
| Mary | Call in | Yes | No | Yes | Lead |
| Michael | Call in | No | Yes | No | Lead |
| Paul | Web | Yes | No | No | Prospect |
| Peter | Web | No | Yes | Yes | Hot Prospect |
| Raymond | Direct Mail | Yes | Yes | No | Lead |
| Rodney | Web | Yes | No | Yes | Prospect |
| Samantha | Call in | Yes | No | No | Suspect |
| Sylvia | Call in | Yes | No | No | Hot Prospect |
| Tracy | Web | No | Yes | No | Hot Prospect |
| Trent | Web | No | No | No | Suspect |

PRIOR ART
FIG. 2

Transactions

View As:
Long, Chris

[Requested Of/By]

| | Subject | Relates To | Due date | Assigned By: To |
|---|---|---|---|---|
| ☐ 2 | No Subject | Cardinal Distributors | ⟩ | 2 ☐ ⇨ Quast, Karen |
| ☐ 3 | Follow-up call | Logical Mobile Networks | - | |
| ☐ 3 | Payment follow-up | Corcoran Management | - | |
| ☐ 3 | Follow-up | Don Law | - | |
| ☐ 3 | Summer outing | ICL imaging | - | |
| ☐ 3 | June 13 | Nixon Peabody | - | |
| ☐ 3 | Aug meeting | Reyes, Carlos | - | |
| ☐ 3 | Follow-up | Tweeter | - | |
| ☐ 3 | Please follow-up to mailing | Firm Affairs, Inc. | ⟩ | 3 ☐ ⬇ Quast, Karen |
| ☐ 3 | Please follow-up to mailing | Abington Saving Bank | ⟩ | 3 ☐ ⬇ Quast, Karen |
| ☐ 3 | Please follow-up to mailing | Reyes, Carlos | ⟩ | 3 ☐ ⬇ Quast, Karen |
| ☐ 3 | Ceridian 4-16-01 | Ceridian | - | |
| ☐ 3 | Follow-up | Firm Affairs, Inc. | - | |
| ☐ 3 | Follow-up | Abington Saving Bank | - | |
| ☐ 3 | No Subject | Printex | - | |
| ☐ 3 | No Subject | WAN Architects | - | |
| ☐ 3 | Incoming fax | Corcoran Management | - | |
| ☐ 3 | No Subject | Tweeter | - | |
| ☐ 3 | Follow-up | Roberts Animal Hospital | - | 3 ☐ ⬇ Quast, Karen |
| ◆ 3 | Please call | Auspice, Inc. | - | |

(1-20 of 22) ▷▷

Select All

| Update | Delegate To... ▷ | Set Priority To: ☐ | Defer For: ▷ or until | ▷ or undefer | Limit to 20 | Go ☐ |

Active (on by default)
Active - deferred until time has expired (on by default)
Deferred until future date/time (off by default)

Show items that have been read (on by default)
Show items that haven't been read (on by default)

Show Self-appointed items (on by default)
Show Delegated items (on by default)
Show Received items (on by default)

Show open items (on by default)
Show items Marked-for-sign-off (on by default)
Show items Signed-off (off by default)

Show items that have been read by Requested Of/By (on by default)
Show items that have been read by Requested Of/By (on by default)

Assignet To: Piasecki, Richard By Quast, Karen
Priority: 3 (Assigned To Priority - 3)
Description: 25 - 100 people Date undetermined
Due Date:
[Goto Page]

*Interested Parties*

*Comments and Actions*

| Date | By | Comment |
|---|---|---|
| 03/01/01 04:34 PM | Piasecki, Richard | The task was marked for sign-off on 3/1/2001 4:34:25 PM |
| 03/01/01 04:34 PM | Piasecki, Richard | End of the month over, sales meeting on monday will cell |
| 02/26/01 07:40 PM | Quast, Karen | The task was reactivated on 2/26/2001 7:40:11 PM |
| 02/26/01 04:14 PM | Piasecki, Richard | The task was marked for sign-off on 2/26/2001 4:14:13 PM |
| 02/26/01 04:14 PM | Piasecki, Richard | Site visit (?) with Pete Cronin Thurs PM |
| 02/14/01 01:24 PM | Quast, Karen | Please give me status on this RJ wants to follow this mailing |
| 02/14/01 01:24 PM | Quast, Karen | The task was reactivated on 2/14/2001 1:24:04 PM |
| 02/14/01 01:00 PM | Piasecki, Richard | The task was marked for sign-off on 2/14/2001 1:00:25 PM |
| 02/14/01 01:00 PM | Piasecki, Richard | Invited him in for a SV this week, Fri no confirmation yet |
| 02/14/01 11:39 AM | Quast, Karen | Is site visit scheduled? |
| 02/14/01 11:39 AM | Quast, Karen | The task was reactivated on 2/14/2001 11:39:12 AM |
| 02/14/01 09:33 AM | Piasecki, Richard | May come in for a site visit 2-16 |
| 02/09/01 10:42 AM | Piasecki, Richard | The task was marked for sign-off on 2/9/2001 10:42:04 AM |
| 02/09/01 10:42 AM | Piasecki, Richard | Greet Lead from mailer, will come in for site visit, incentive event in MAR |
| 02/08/01 10:29 PM | Quast, Karen | The task was delegated |

Comment:

[Add Comment]

*Subdelegated Tasks*

| P | SOS | URR | URT | Subject | Related To | Assigned To | Due Date |
|---|---|---|---|---|---|---|---|

SYSTEM AND METHOD FOR DYNAMIC MANAGEMENT OF BUSINESS PROCESSES

CROSS REFERENCE TO RELATED APPLICATION

This application claims priority from provisional application Ser. No. 60/191,320, filed Mar. 21, 2000, the contents of which are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

FIELD OF THE INVENTION

Embodiments of the present invention are directed to computer software and systems. More specifically, embodiments of the present invention are directed to customizable computer-implemented systems and software for dynamically creating, managing, and executing business processes such as sales and marketing.

BACKGROUND OF THE INVENTION

The need for companies to manage complex business processes has never been greater. Since the widespread use of the Internet, intranets, and extranets, the need to streamline business processes and adapt them to the emerging web architecture has become more acute. Information glut and overload has become commonplace, and it is difficult for people to "keep up." Getting the right information to the right people at the right time (including employees, customers, and suppliers) and enabling them to act upon it in an appropriate manner is a huge and difficult undertaking.

Complex processes, the organized flow of work according to specific rules and interdependencies, are everywhere in business. They include the marketing cycle, which involves customer identification and profiling at the early stage and delivery of targeted marketing vehicles at specific time intervals during later stages. Another process with many interdependencies is the sales cycle, which typically includes multiple steps beginning with initial contact with the prospect all the way to consummating a sale. Project management, supply chain management, and customer service are a few of the other areas which involve complex chains of events that can be electronically represented, tracked and analyzed.

Managing business processes is one of the most important functions of a business. For example, sales leads are critical to revenue generation. Customer service inquiries are critical for maintaining customer satisfaction. Yet, by some estimates, 60% of leads and inquiries never get into the right person's hands (salesperson, distributor, reseller, support personnel, etc.), and this number will increase as the Internet becomes more important as a source of business. To compound the problem of lost or misdirected leads and inquiries, few companies track their business processes, including lead management, systematically as the steps in the business processes move from one party to another, to determine whether the appropriate action is taken and at what cost. As a result, companies are unable to perform return on investment (ROI) calculations on activities such as lead generation and management activities. Any product or process that can help companies manage its business processes more effectively, resulting in better sales, marketing, and customer service, will be welcome in the marketplace.

Traditional system design methods focus first on what information must be captured and stored in order to produce the needed output. The result is called the data model and much time and effort go into defining the variables (fields), their logical groupings (records) and their relative associations with other variables and groupings (relationships). The resulting definitions, referred to as a database schema, are the primary foundational architecture of any relational database application. Software products that host these data models or schemas are known as relational databases, including DB2, available from International Business Machines of White Plains, N.Y., ORACLE, available from Oracle Corporation, Redwood Shores, Calif., and MICROSOFT SQL, available from Microsoft Corporation of Redmund, Wash.

FIG. 1 is an example of a small subset of a hypothetical prior art data model representing a sales cycle. In this example, several variables or fields are logically grouped to define a contact record. For example, the field labeled "Sales status," represents the current status of the contact named "Stewart Little" within the sales cycle. For this example, assume the sales cycle consists of the following progression of possible choices: Lead, Suspect, Prospect, Hot, Customer. Each choice represents that status of a given contact. In FIG. 1, Stewart Little is currently at the second step (i.e., "Suspect"). As an organization markets to Stewart and his status changes, the value of the Sales status field changes from Suspect to Prospect, then to Hot, then to Customer. In this data model, the value of the field determines the status of Stewart's progression within the sales process. This data model approach can be referred to as field-based process modeling.

In field-based workflow models, fields grouped together are logically associated and form "ladder"-like structures, whereby each ladder contains a description of all candidates in relation to the value being defined. An example of such a Sales Status Value ladder for the data model of FIG. 1 is shown in FIG. 2. In the example of FIG. 1, the Sales Status Value ladder of FIG. 2 shows the status of values for all candidates (Lead, Suspect, Prospect, etc). Changes to any one individual's "rung" value are captured, but the audit trail of when it changed and what it changed from is not automatically monitored or easily captured. These events must be hard coded by the application developers. Tracking changes such as the addition or deletion of fields, moreover, can be difficult to program.

Obviously, the data model of FIG. 1 is but a tiny subset of what would need to be designed into a data model capable of thoroughly representing most sales processes. Additional fields typically would be added for each data element that a sales organization might want to track in relationship to the contact. For example, the sales organization might want to capture demographic data such as age, employment, and income information etc. Different campaigns or marketing processes could feed off of these variables.

Access to data models such as that shown in FIG. 1 historically have been facilitated via application languages like COBOL and Fortran (used in the 70's and 80's) Powerbuilder, FoxPro, Visual Basic, C++ (Popular in the 90s), and currently popular techniques such as Active Server Pages (ASP), Extensible Markup Language (XML), Hypertext Markup Language (HTML) and other web-based languages. Essentially, these application languages provide the developer with the toolkit for defining the way and manner in which the user interacts with the data model—the user interface.

SUMMARY OF THE INVENTION

While both database software and the application languages used to access them have evolved considerably in recent years, the approach to building applications has not. The rigid need to define the data structure beforehand has not significantly evolved. Changing a data model after the programming has started is equivalent to redesigning the foundation of a house after the frame has been put up. Changing requirements, however, are a given in business today, and changes to requirements is a major factor in the software industry's dismal success rates on custom software projects. While some of this can be blamed on lack of design skill, it often is simply a function of needs changing from the time when the system was originally constructed. This time-span can be as long as many years or as short as several weeks. It would be advantageous to provide software applications that are parameter driven—that is, that the application can tolerate degrees of change in the requirements.

It is one object of the present invention to help solve these and other problems, especially the need for better management and optimization of business processes and technologies, by providing an easily adaptable architecture for building business process management applications. These applications can fit any number of vertical industries with quick modification, because in one aspect the present invention provides a list-based process model instead of a field-based process model. The list-based process model has several advantages that give it more flexibility and adaptability than the traditional approach, which typically requires hard coding when significant changes are made. Thus, systems implemented in accordance with the present invention can perform lead management functions and measurements without extensive recoding, resulting in fast time-to-market, better ease of use, and less cost.

It is another object of the present invention to provide an architecture for building business process management applications, which architecture includes a list engine to maintain the modularity of its components and object classes, to build a customer relationship management (CRM) platform that supports rapid adaptation to ever-changing requirements. In accordance with this aspect of the invention, the architecture includes an entity data model, a list-based processing model, and a flexible user interface that provide adaptability and portability to multiple vertical markets.

In one embodiment, the present invention provides a computerized system for modeling a business process, comprising a web server and a database server. The web server implements a user interface to the system. The database server is in operable communication with the web server and comprises a data architecture representing the business process. The data architecture comprises an entity model representing an entity responsible for implementing at least a portion of the business process, a transaction model comprising at least one step defining a business process, a list model representing at least one step in the transaction, the list model comprising a list of at least one entity associated with the transaction, and a task model associated with the list, the task model defining at least one task associated with the at least one step in the transaction.

BRIEF DESCRIPTION OF THE DRAWINGS

An understanding of the principles of the invention may be readily attained by reference to the following specification and the accompanying drawings in which:

FIG. 1 is an example of a hypothetical prior art data model representing a sales cycle;

FIG. 2 is a Sales Status Value ladder for the data model of FIG. 1;

FIGS. 17A through 17C illustrate representative screen shots of a GUI interface to the system of FIG. 4;

FIGS. 19A-19C are a representative screen shot and legends for icons in the screen shot, respectively, illustrating a summary page of a task management system implemented in accordance with one embodiment of the invention;

FIG. 20 is a representative screen shot showing another view of the screen shot of FIG. 19A, with some items filtered by status, in accordance with one embodiment of the invention;

FIG. 21 is a representative screen shot showing a view of the details of in accordance with one embodiment of the invention.

The drawings are not necessarily to scale, emphasis instead generally being placed upon illustrating the principles of the invention.

DETAILED DESCRIPTION OF THE PREFERRED EMBODIMENT

As used herein, the Internet refers at least to the worldwide collection of networks and gateways that use the transmission control protocol/Internet protocol (TCP/IP) suite of protocols to communicate with one another. The World Wide Web (WWW) at least refers to the total set of interlinked hypertext documents residing on hypertext transport protocol (HTTP) servers all around the world. As used herein, the WWW is also intended at least to refer to documents accessed on secure servers, such as HTTP servers (HTTPS), which provide for encryption and transmission through a secure port. WWW documents, referred to herein as web pages, can be written in hypertext markup language (HTML). As used herein, the term "web site" refers at least to one or more related HTML documents and associated files, scripts, and databases that is presented by an HTTP or HTTPS server on the WWW. The term "web browser" refers at least to software that lets a user view documents, such as HTML documents, and access files and software related to those documents.

In accordance with the descriptions of the invention provided herein, it should be understood that although the systems and methods of the present invention have been heretofore described in relation to sales, marketing, and task management, the invention is not intended to be limited to these types of application. Those skilled in the art will appreciate that the invention, for example, has applicability to virtually any type of system that uses databases or any situation where information is modeled, accessed, or used via a prior art model, such as a field-based model.

Figure 3:
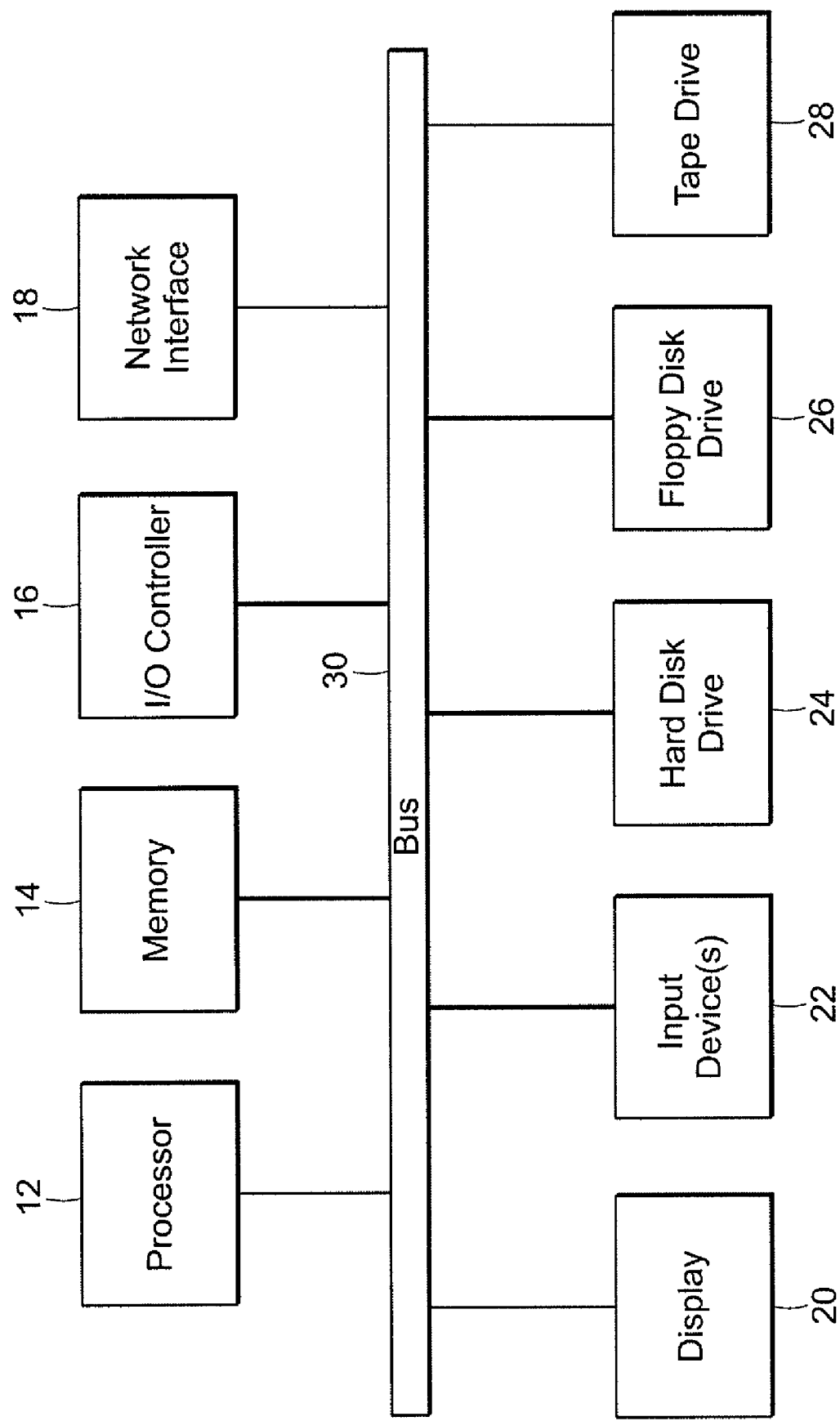
FIG. 3 is an illustration of a computer system in which the present invention can be embodied.

In one embodiment, the present invention comprises a computerized system implementing the systems and methods for dynamic management of business processes described herein. FIG. 3 is a simplified block diagram of a computer system 10 in which at least a portion of the system of the present invention can be embodied. The computer system 10 can be any type of general purpose computer system, such as a personal computer (PC), server, workstation, personal digital assistant (PDA), and the like, running any one of a variety of operating systems. In addition, software embodying the present invention may, in one embodiment, reside in an application running on the computer system 10. The present invention can also be embodied in a computer-readable program medium usable with a computer system such as the computer system 10.

Referring to FIG. 3, the computer system 10 typically includes a central processor 12, a main memory unit 14 for storing programs and/or data, an input/output controller 16, a network interface 18, a display device 20, one or more input devices 22, a fixed or hard disk drive unit 24, a floppy disk drive unit 26, a tape drive unit 28, and a data bus 30 coupling these components to allow communication therebetween.

The central processor 12 can be any type of microprocessor, such as a PENTIUM processor, made by Intel of Santa Clara, Calif. The display device 20 can be any type of display, such as a liquid crystal display (LCD), cathode ray tube display (CRT), light emitting diode (LED), and the like, capable of displaying, in whole or in part, the outputs generated in accordance with the systems and methods of the invention. The input device 22 can be any type of device capable of providing the inputs described herein, such as keyboards, numeric keypads, touch screens, pointing devices, switches, styluses, and light pens. The network interface 18 can be any type of a device, card, adapter, or connector that provides the computer system 10 with network access to a computer or other device, such as a printer. In one embodiment of the present invention, the network interface 18 enables the computer system 10 to connect to a computer network such as the Internet.

Those skilled in the art will appreciate that systems and methods embodying the present invention need not necessarily include every element shown in FIG. 1, and that equivalents to each of the elements are intended to be included within the spirit and scope of the invention. For example, not all computer systems 10 will include a tape drive 28, and some computer systems 10 might include other types of drives, such as compact disk read-only memory (CD-ROM) drives.

In one embodiment of the present invention, one or more computer programs define the operational capabilities of the computer system 10. These programs can be loaded into the computer system 10 in many ways, such as via the hard disk drive 24, the floppy disk drive 26, the tape drive 28, or the network interface 18. Alternatively, the programs can reside in a permanent memory portion (e.g., a read-only-memory (ROM)) chip) of the main memory 14. In another embodiment, the computer system 10 can include specially designed, dedicated, hard-wired electronic circuits that perform all functions described herein without the need for instructions from computer programs.

The computer system 10 can be part of a client-server system, in which a client sends requests to a server and a server responds to requests from a client. That is, the computer system 10 can be either a client system or a server system. The present invention typically is implemented at the server side and responds to requests made from a client.

The client can be broadly understood to mean any entity capable of transmitting requests to a server, such as the computer system 10, or specific components thereof (e.g., terminal, personal computer, mainframe computer, workstation, hand-held device, electronic book, personal digital assistant, peripheral, etc.), a software program running on a computer directly or indirectly connected or connectable in any known or later-developed manner to any type of computer network, such as the Internet. For example, a representative client is a personal computer that is x86-, PowerPC®, PENTIUM-based, or RISC-based, that includes an operating system such as IBM® OS/2® or MICROSOFT WINDOWS (made by Microsoft Corporation of Redmond, Wash.), and that includes a Web browser, such as MICROSOFT INTERNET EXPLORER, NETSCAPE NAVIGATOR (or higher) (made by Netscape Corporation, Mountain View, Calif.), having a Java Virtual Machine (JVM) and support for application plug-ins or helper applications. A client may also be a notebook computer, a handheld computing device (e.g., a PDA), an Internet appliance, a telephone, or any other type of data entry device or terminal, such as a multimedia kiosk, telecommunications device, or interactive television, capable of connecting to or transmitting information over a computer network.

The term "server" should also be broadly construed to mean an entity such as a computer, computer platform, an adjunct to a computer or platform, or any component thereof, such as a program, that can respond to requests from a client. Of course, a "client" can be broadly construed to mean one who requests or gets the file, and "server" can be broadly construed to be the entity that downloads the file. The server also may include a display supporting a graphical user interface (GUI) for management and administration, and an Application Programming Interface (API) that provides extensions to enable application developers to extend and/or customize the core functionality thereof through software programs including Common Gateway Interface (CGI) programs, plug-ins, servlets, active server pages, server side include (SSI) functions or the like.

The client and server can communicate using any system or transmission method capable of interconnecting two entities that are capable of communicating with each other, such as the Internet, an intranet, an extranet, or other computer networks. For example, networks can be land-based networks, wireless networks, and combinations thereof, including telephone lines, cable television lines, direct physical connections, and networks include networks that transmit information over the airwaves, such as cellular, satellite, microwave, packet radio, infrared line of sight, and spread spectrum technologies.

Figure 4:
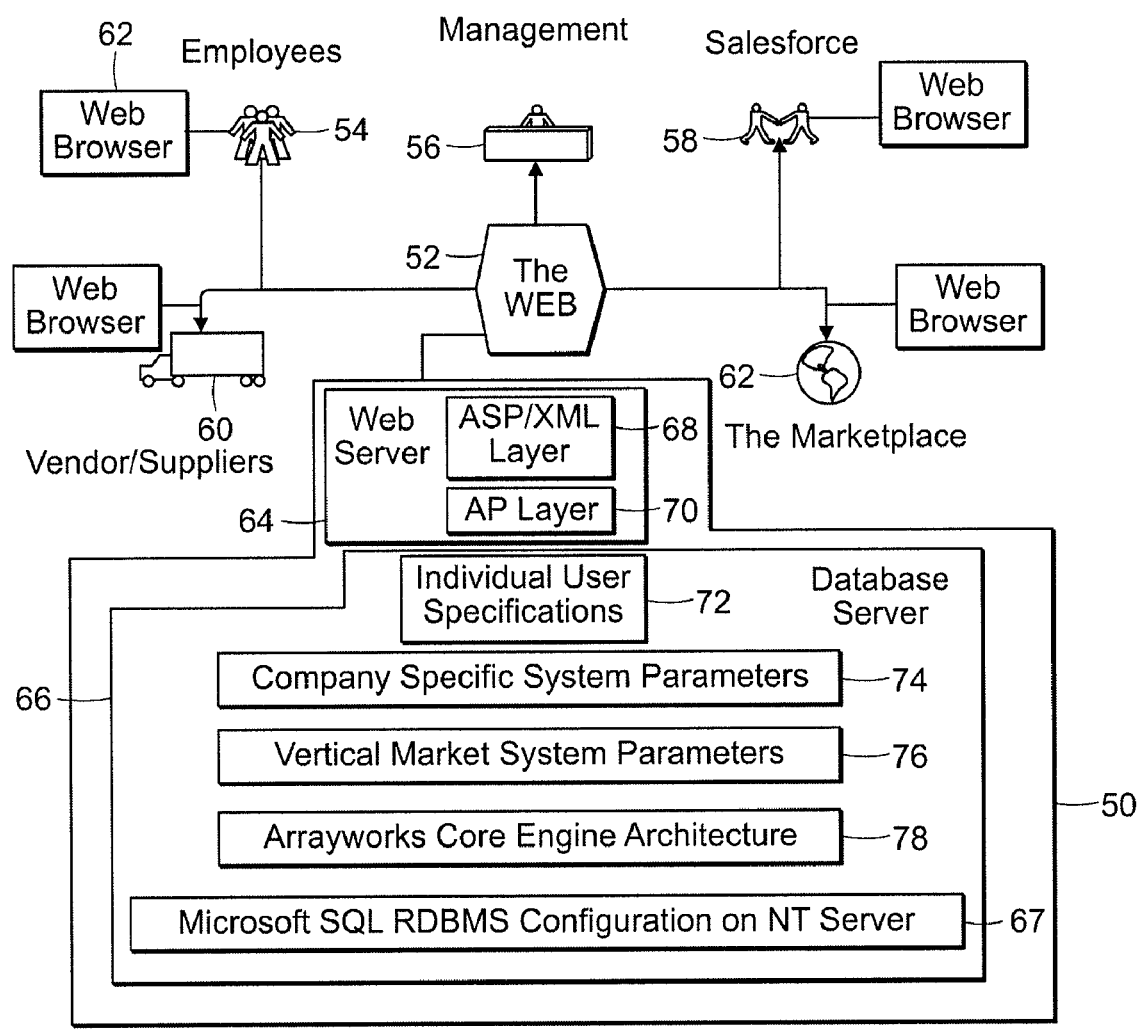
FIG. 4 is an illustration of a system implemented in accordance with one embodiment of the present invention together with the representative environment in which the system can be used.

FIG. 4 is an illustration of a system 50 implemented in accordance with one embodiment of the present invention, together with a representative environment in which the system 50 can be used. The system 50 is implemented at a server that is part of a networked communications system communicating over the world wide web 52 ("web 52"). In FIG. 4, the representative environment is a business in which employees 54, managers 56, salespeople 58, vendors/suppliers 60, and participants in the world marketplace 62 all have networked communications access to each other via the web 52. The representative environment of FIG. 4 also can be implemented via other types of computer networks, including intranets and extranets. Users of the system 50 access the system 50 using a web browser such as MICROSOFT INTERNET EXPLORER and can communicate with it using Internet Protocol (IP).

The system 50 of this embodiment of the invention comprises a web server 64 and a database server 66. The web server 64 includes interacting components that drive the user interface (which is explained more fully herein) of the system 50, including an Application Service Provider (ASP)/XML layer 68, and an Application Program Interface (API) layer 70. The ASP/XML layer 68 provides a user interface by which appropriate personnel, such as management 56, can modify the table structure in the database server 66. Using the ASP model, the system 50 hosts the application or platform that clients access. A provider of this application/platform can, for example, lease or rent the application to users for given periods of time, e.g., monthly. This implementation is particularly advantageous for small to medium size companies that do not have an information technology (IT) staff or infrastructure to maintain this functionality internally. In addition, the ASP/XML layer 68 can be configured to have the same "look and feel" as a given legacy database system with which a user of the system 50 is familiar.

It should be understood that, although the embodiment of FIG. 4 illustrates the system 50 as having a single web server 64 and a single database server 66, this embodiment of the present invention is scaleable. For example, depending on the needs of the clients accessing the system 50, the system 50 may be accomplished by distributing the functionality of the web server 64 over several different web servers 64 (not shown), such as "mirror" servers. Similarly, although each client accessing the system 50 typically is associated with its own database, the database functionality may be implemented using more than one database server 66.

The database server 66 includes a database manager 67, such as the MICROSOFT SQL (structured query language) RDMS (relational database management system) configured on a MICROSOFT WINDOWS NT Server, individual user specifications 72, company specific system parameters 74, vertical market system parameters 76, and a core engine architecture 78. The system 50 can store individual user specifications 72 for each user of the system 50 and company specific system parameters 74, to accommodate the different types of parameters and types of data that different businesses may need to manage. In one embodiment, the database server 66 provides a unique database for each client accessing the system 50 (clients also are referred to as users). The system 50 also includes vertical market system parameters 76 and a core engine architecture 78. In one embodiment, the vertical market system parameters 76 comprises a set of vertical market templates that operate on top of the core engine architecture 78. The templates include "standard" types of business workflows that can be customized to match each customer's specific workflow and process requirements. Thus, the operation of the system 50 can be designed to have the same "look and feel" that a user is accustomed to in a legacy system, which can significantly reduce the learning curve.

Using such vertical market templates has other advantages, as well. For example, a company using the system 50 can create industry-specific value chain intranets serving different users all working in an environment customized to their workflow and marketing process. If a company is acting as a host application service provider (ASP), it need only support one software application, which can greatly increase the company's leverage. As explained below in connection with the task management aspect of the invention, use of the list-based model of the present invention enables the platform to support virtual workflow exchange between any/all users.

Figure 5:
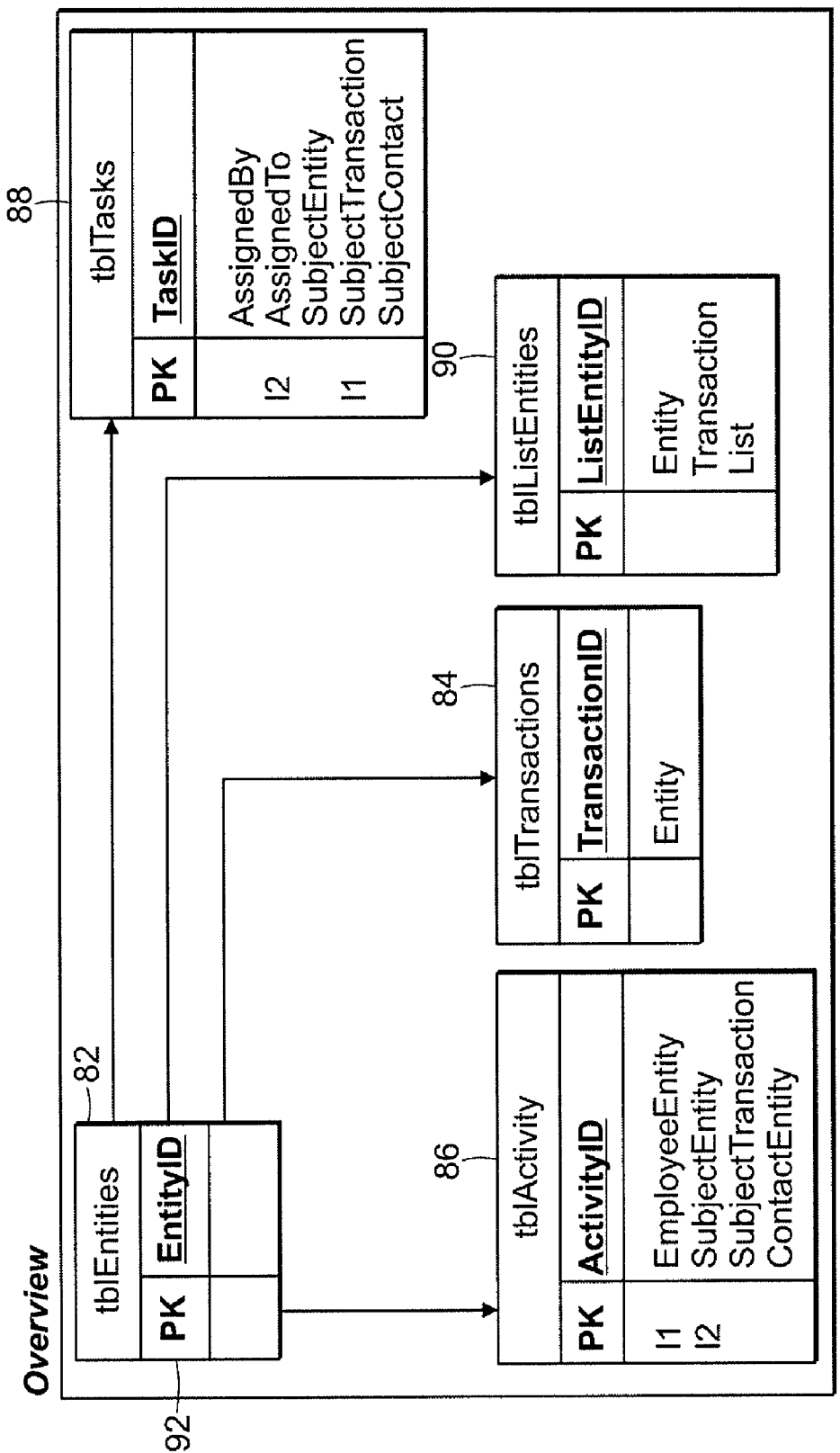
FIG. 5 illustrates an overview of a representative data schema for the core engine architecture of FIG. 4.

The core engine architecture 78 further includes a data schema, and FIG. 5 illustrates an overview of a representative data schema 80 for the core engine architecture 78 of FIG. 4. The data schema 80 for the core engine architecture 78 includes SQL objects, which can be related, representing data tables for Entities 82, Transactions 84, Activities 86, Tasks 88, and Lists 90 (each of these is explained more fully herein). Each SQL object is associated with a primary key 92 (shown in FIG. 5 by the notation "PK"), which the database server 66 can use to help organize the order and/or manner in which it stores information. In the representative data schema of FIG. 5, for example, the primary key 92 for the data table for Entities 82 refers to the identifier termed "Entity ID" as a primary key by which the database server 66 associates information associated with the particular entity.

Figure 6:
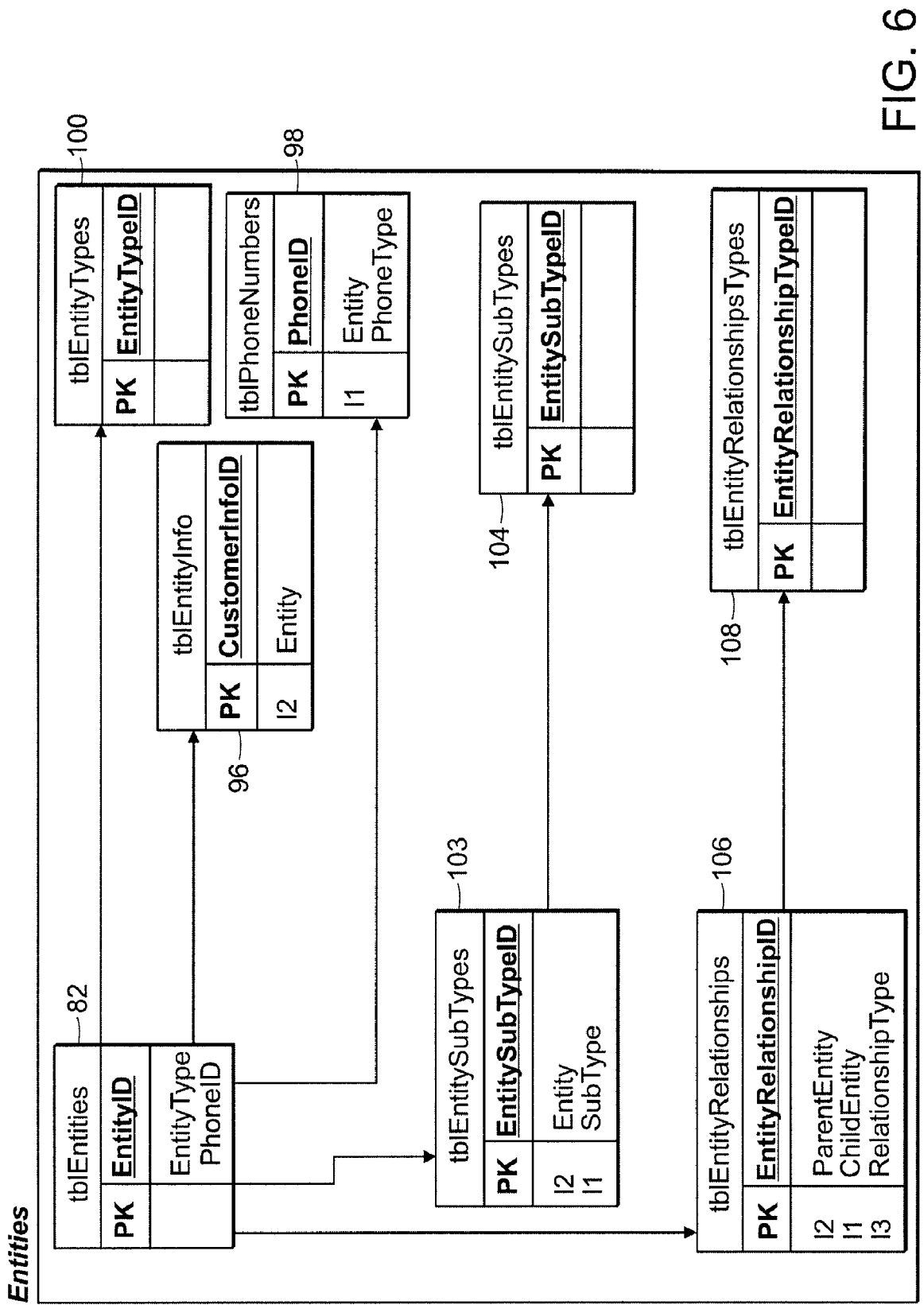
FIG. 6 is a representative example of the entity schema for the entity of FIG. 5.

An Entity 82 refers to any stakeholder in or associated with an organization that uses the system 50. Entities 82 can be organizations, people, or locations and can have inheritance, like other objects. FIG. 6 is a representative example of the Entity Schema 94 (also referred to as an Entity data model) for the Entity 82 of FIG. 5. In this example, the SQL object representing the table of Entities 82 is associated with a core record of information, which in this example includes SQL objects representing a table of Customer Information 96 (e.g., customer name and (address) and a table of Phone Numbers 98. It should, of course, be understood that the example of information provided in the example of a core record is merely representative of the type of information that can be stored and is not intended to be limiting.

The SQL object representing the data table for the Entity 82 is further associated with other SQL objects representing data and lookup tables associated with the Entity 82, as shown in FIG. 6. For example, the Entity 82 is associated with an SQL object representing a lookup table for Entity Types 100, a table of Entity Sub Types 102, a lookup table of Entity Sub Types 104, a table of Entity Relationships 106, and a lookup table of Entity Relationship Types 108.

The types of Entities 82 listed in the lookup table of Entity Types typically will correspond to the particular type of client using the system 50, and the available Entity Types can be a function of the company specific system parameters 74 and/or the vertical market system parameters 76 (FIG. 4). For example, for an online business to consumer (B-C) site selling books directly to consumers over the Internet, the Entity Types might include types such as sales, publisher, shipper, customer service, and customer, and each of these Entities 82 could have associated with it a core record of information, as described above.

A "stakeholder" or other user of the system 50 can fit the definition of more than one Entity Type 100, depending on the point of reference or situation. In the above B-C example, a publisher associated with the online B-C site may also, at certain times, be a customer of the online B-C site. Thus, this particular Entity may be associated both with an Entity Type 100 of "publisher," and an Entity Sub Type 102 of "customer." Thus, the data schema 94 for an Entity 82 can recognize that a given client of the system 50 (in this example, a given Entity 82, such as the publisher) can be classified in more than one way depending on the context or frame of reference. This characteristic of an Entity 82 is particularly useful for the list-based models of the invention, as will be shown below.

The Entity Relationships 106 and Entity Relationship Types 108 also can be associated with the Entity 82 and refer to relationships that a given Entity 82 may have with other Entities 82. For example, a first entity may be a given organization, and a second entity may be related to the first entity in that the second entity is a contact at the given organization. Thus, the first entity can be considered to be a "parent" entity and the second entity can be considered to be a "child" entity, having an Entity Relationship Type 108 called "organization-contact". Note that the first entity may have other "child" entities with which it has the Entity Relationship Type called "organization-contact". In addition, the first entity and the second entity could be related in different ways in different contexts; thus, they may be classified under more than one Entity Relationship 106.

Thus, the Entity data model 94 of FIG. 6 supports "many to many" relationships and defines Entities 82 by their relationships to other Entities 82 and to the organization. If it is necessary to modify information associated with an Entity 82 because of changes in its role in, relationship to, and/or responsibility for an organization or business process, it is not necessary to create an entirely new Entity data model 94. Rather, because the Entity data model 94 is organized around relationships, the additional roles and/or responsibilities of an Entity 82 can be described by adding to or deleting from the Entity data model 94 the requisite Entity Relationships 106, Entity Types 100, Entity Sub Types, 102, etc. Note that the Entity data model 94 will not require new SQL objects to handle such changes; rather, the existing data structure of the Entity data model 94 (i.e., the tables represented by SQL objects) has the flexibility to handle the changes.

Figure 7:
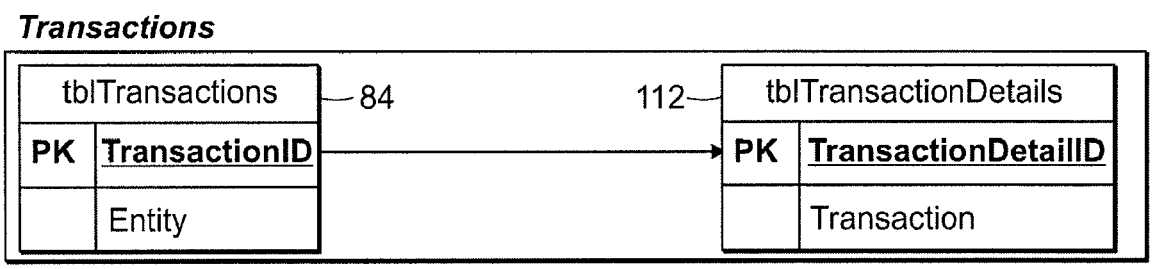
FIG. 7. is a representative example of the transaction schema for the transaction of FIG. 5.

FIG. 7. is a representative example of the Transaction Schema 112 (also referred to as an Transaction data model) for the Transaction 84 of FIG. 5. Transactions 84 are the primary "high level" events or business transactions that take place between and among Entities in a given business model. In many businesses, such high-level events/business transactions are definable by a business process, and in many industries the business process is industry specific. For example, if a business using the system 50 was a realtor, an example of a Transaction 84 associated with that business is the selling of a home, which is associated with an entity such as a real estate agent. The realtor may have its own "best practice" business practice associated with accomplishing the transaction of "selling a home," which might include steps such as: Sign listing agreement with homeowner, Generate real estate listing, Submit listing to multiple-listing service, Hold open house, etc., and at each of these steps the entity (real estate agent) may have further sub-responsibilities or Tasks (see below). In contrast, businesses such as insurance agencies, manufacturers, retailers, etc., may have their own set of Transactions 84, each definable by a business-specific, but possibly customized, business process.

Referring again to FIG. 7, each Transaction 84 is associated with at least one Entity 82. The Transaction Schema 112 also associates with a Transaction 84 an SQL object representing a data table of Transaction Details 112, which at includes high level information about the transaction. The association between the Transaction 84 and the Entity 82 is referred to as an Entity/Transaction Pair, and as a Transaction 84 moves through its various steps, the status of the Entity 82 at each step can be known and managed, and if other Entities 82 are involved in the same transaction, it is possible to track and manage their role in the Transaction 84. This is advantageous for businesses such as realtors, where multiple agents each typically handle multiple home sales, sometimes with more than one agent associated with the same home sale.

Referring again to FIG. 5, Tasks 88 are another type of data structure associated with one embodiment of the system 50. Tasks 88 are individual action items that originate from being self-assigned, delegated, or system generated. Typically, Tasks 88 are associated with Entities 82 and Transactions 84. Tasks 88 define and/or enumerate the actions to go between states in a given business process. For example, using the above example Transaction of a home sale, the step of "Holding an open house" might involve its own set of Tasks 88, some of which may be the direct responsibility of the Entity 82 associated with the Transaction 84, such as Hosting the Open House. Another Entity 82, such as the real estate agent's secretary at the Realtor, who is also an Entity 82, may have one or more delegated tasks, such as Placing a newspaper advertisement. Tasks 88 also can be sub-delegated; for example, the real estate agent's secretary may sub-delegate the task of Placing a newspaper advertisement, which was delegated to her, to a receptionist (who also is an Entity 82). Tasks 88 also are associated with another aspect of the present invention, called Task Management, which is described more fully below.

As noted above, a Transaction 84 associated with a given business can be defined using one or more business processes, each consisting of a series of steps or "states" of the process. Tasks are types of actions associated with the steps of states. Lists, explained below, help to define each step or state in the business process. Lists also can be used to organize and segment information such as market, demographic, and/or business-specific parameters.

In accordance with the present invention, a business process can be thought of as referring to a set of states that move an Entity or an Entity/Transaction Pair along some sequence of events. Typically, the lists of the present invention can be used to "automate" a given business process. For example, a Generic Customer Process might include the following sequence of events: Marketing and Sales, Product/service development and introduction, Manufacturing, Distribution, Billing, Order Processing, Customer service, and Warranty administration. In one embodiment, the present invention also can provide for industry-specific customer processes, such as Loan processing (banking), Claim adjudication (insurance), Grant allocation (government), Merchandise return (retail), Food preparation (restaurant), Baggage handling (airline), Operator services (telecommunications), User-manual writing (computer), Reservation handling (hotel), and the like.

Figure 8:
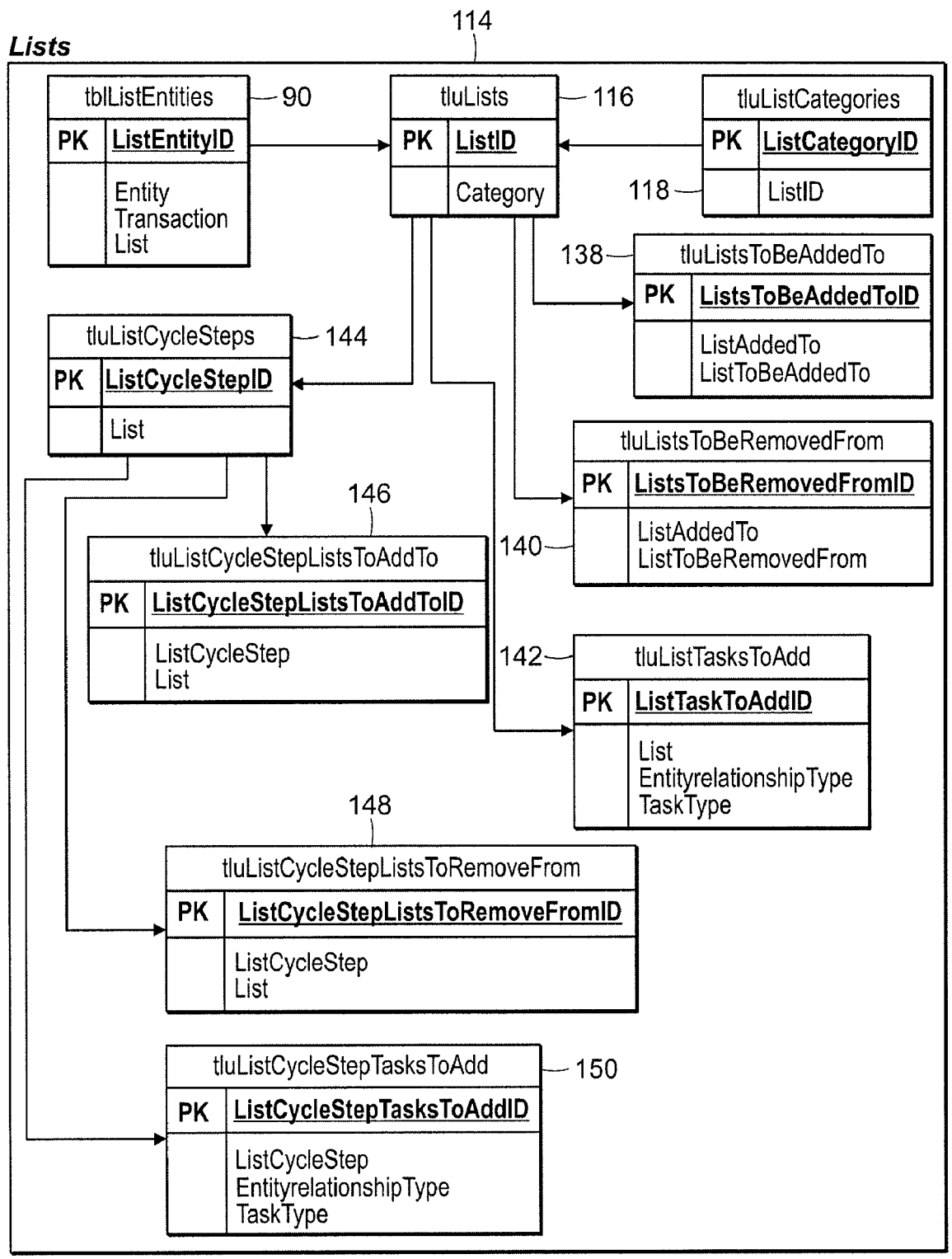
FIG. 8. is a representative example of the list entities schema for the list entities of FIG. 5.

FIG. 8. is a representative example of the List Entities Schema 114 (also referred to as a List data model) for the List Entities 90 of FIG. 5. List Entities 90 are associated with an SQL object representing a lookup table of Lists 116. In accordance with the present invention, Lists 116 are a way to represent any state or set of information that can be attained by or associated with any Entity 82, and provide a way to group and track Entities 82 and Entity/Transaction pairs. For example, a List 116 could represent all of the customer entities in a particular marketing campaign, the status of a customer in a sales cycle, or the stage of a new employee in a training program. Lists 116 can be grouped into List Categories 118, such as Customer Status and Marketing Campaigns.

Figures 9A, 9B:
FIGS. 9A-9B are illustrations comparing a field-based data structure and a list-based data structure in accordance with one embodiment of the invention.

In contrast to the field-based methodology illustrated in FIGS. 1 and 2, the Lists 116 of the invention (and the associated list-based data storage) effectively equates to making field values their own "world" where business rules can easily be applied, changes automatically tracked, and actions based on those changes triggered—immediately or on a delayed basis. FIGS. 9A-9B help to illustrate the difference between a field-based data structure 120 developed in accordance with field-based data storage principles (FIG. 9A) and a list-based data structure 122 developed in accordance with the list-based data storage principles (FIG. 9B) of the present invention.

In FIG. 9A, the field-based data structure 120 has two fields, a Name field 124 and a Sales Cycle Status field 126. FIG. 9B illustrates a list-based data structure that represents equivalent information to the field-based data structure of FIG. 9A. In FIG. 9B, the first data record 120 has been converted to a set of Lists 116: a Name List 128, each entry on which is associated with one of a Lead List 130, a Suspect List 132, a Prospect List 134, and a Hot List 136. Thus, Lists 116 are created for each possible value, showing who "belongs" to the list at any given time. In FIG. 9B, there currently are 6 names that are part of the Lead List 130, and as they move through the sales process, they will typically move to the Suspect List 132. Names are added to and moved from list to list as their particular situation changes. For example, if Alice's Sales Cycle Status changes from Suspect to Prospect (the next step in a predefined progression of Lead-Suspect-Prospect-Hot), her name would be removed from the Suspect List 132 and added to the Prospect List 134.

If an organization using the field-based data structure 120 to track the status of potential sales contacts, such as the names in the Name field 124, and the organization wishes to begin tracking additional types of information, such as whether or not the people have been sent information, additional fields must be added to the field-based data structure 120. These additional fields must be added to the field-based data structure 120 even if the fields added are not applicable to some names on the list. In some instances, each record must be manipulated and/or updated in order to implement the added field. As more and more fields get added, each data record for the field-based data structure 120 gets longer and longer, even if a great number of the fields end up being blank for a great number of people on the list. Updating field-based data structures 120, therefore, can be time consuming and waste computer storage space.

In contrast, with list-based data storage, when additional information about list members is to be tracked, relevant associations can be added as needed (similar to the relationships for Entities 82) so that only the actual people who require the additional information get the associations.

Figure 10:
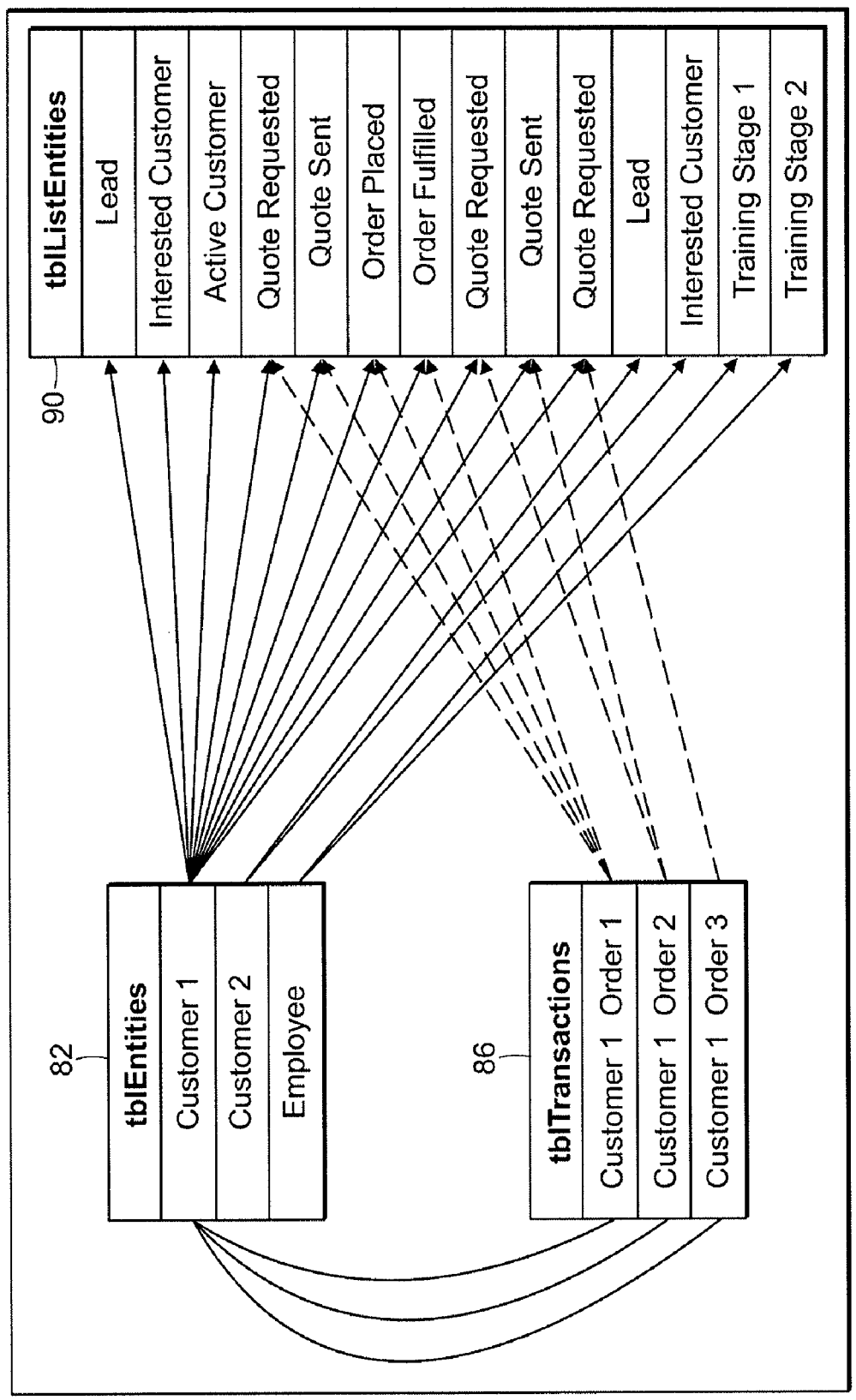
FIG. 10 illustrates a representative layout of entities, transactions, and list entities, in accordance with one embodiment of the invention.

Note that not just Entities 82, but also Entity/Transaction pairs can be part of a List 116. FIG. 10 illustrates a representative layout of Entities 82, Transactions 86, and List Entities 90, in accordance with one embodiment of the invention. In FIG. 10, one Entity 82 ("Customer 1") is associated with three different Transactions 86 ("Order 1", "Order 2", and "Order 3"); each grouping (indicated by the respective curved connecting line) is a respective Entity/Transaction pair. The List Entities 90 in bold (namely, "Active Customer," "Order Fulfilled," "Quote Requested," and "Interested Customer") are the lists that the Entity 82 and/or Entity/Transaction pair is currently in. Thus, for example, the entity Customer 2 has arrows pointing in the List Entities 90 list to indicate that it is on both the Quote Requested List (because its status is "Lead") and on the Interested Customer List. Similarly, the Entity/Transaction pair of Customer 1 Order 3 is indicated as being only on the Quote Requested List.

In one embodiment, the Lists 116 of the invention can provide a history tracking feature (also referred to as time-stamping). The history tracking can, for example, be an optional feature that an organization using the system 50 can choose whether or not to implement for a given list. If history tracking is implemented, when an Entity 82 or Entity/Transaction pair is removed from a List 116, the list entity record is not deleted but simply can be marked as "removed from". Referring again to FIG. 8, the List Entities Schema 114 associates with Lists 116 SQL objects representing lookup tables for Lists to be Added To 138 and Lists to be Removed From 140. This allows for the tracking of list history. For example, such tracking could be used to calculate the average time between stages in a sales cycle.

Lists 116, in accordance with one embodiment of the invention, are not simply static objects but instead can have rules associated with them. Rules can perform three basic actions: add an Entity 82 to one or more additional Lists 116, remove the Entity 82 from one or more Lists 116, or create Tasks 88. There are two types of rules associated with lists: action-based rules and time-based rules. Action-based rules apply when an Entity 82 is added to a list. Referring again to FIG. 8, the representative List Entities Schema 114 provides for action-based rules using SQL objects representing lookup tables for Lists to be Added to 138, Lists to be Removed From 140, and List Tasks to Add 142 (i.e., the three basic actions for the action-based rules). The following are representative examples of action-based rules which might be used in a sales organization:

1. When an entity is added to the Customer Status-Interested Customer list, the entity is to be removed from all other Customer Status lists.
2. When an entity/transaction pair is added to the Order Status-Order Placed list, the entity is to be removed from all other Order Status lists and to be added to the Customer Status-Active Customer list and a Task is to be sent to a Fulfillment Rep (e.g., another Entity) to fill the order.

Time-based rules apply when an Entity 82 has been on a List 116 for a predetermined period of time. Referring again to FIG. 8, the representative List Entities Schema 114 provides for time-based rules using SQL objects representing lookup tables, in a similar manner as for action-based rules, via List Cycle Steps 144 (the "Cycle" refers to the predetermined time period), List Cycle Step Lists to Add To 146, List Cycle Step Lists to Remove From 148, and List Cycle Step Tasks to Add 150. The following are representative examples of time-based rules:

3. When an entity has been on Customer Status-Active Customer List for 30 days place the entity on the Send 30 Day Offer Email list.
4. When an entity has been on the Customer Status—Active Customer List for 32 days, create a task for a Sales Rep (Entity) to follow up on the 30 Day Offer email.

Note that, for time-based Rule #3 above, the time-based rule does not actually send out the electronic mail ("email"). Rather, in this example, the time-based rule puts the entity on a specified list (i.e., the "Send 30 Day Offer Email List"). When the entity is added to the Send 30 Day Offer Email List, an action-based rule (which, as described previously, applies when an Entity 82 is added to a List 116), causes a routine capable of sending an email, such as an auxiliary program that monitors the Send 30 Day Offer Email List, to automatically send the email and then remove the entity from the Send 30 Day Offer Email List. Rule #4, in contrast, accomplishes the same net result as Rule #3 (the entity gets a 30 Day Offer email), but instead, this is accomplished by assigning a Task to another Entity 82. Although not illustrated in the above rules, when Tasks 88 are generated (such as by an action or time-based rule), in one embodiment of the invention, an email notification can be sent to the Entity 82 responsible for accomplishing the Task 88. This feature also can be part of the Task Management aspect of the invention, as described herein.

It should be understood that the action and time-based example rules just described are not intended to be limiting. Depending on the organization using the system 50, virtually any type or number of rules can be associated with a List 116.

Another feature of the Lists 116 of the invention is that the action and time-based list rules are recursive. The following sequence of steps is illustrative of this feature (note that the action based rules below will occur when an entity is added to the list associated with the rule):

Assume that a List C (list of entities to receive free baseball tickets) has an action based rule associated with it that causes an entity to be removed from a List E (list of leads who haven't received free sporting tickets) and added to a list D (list of leads to be called for special offers for sporting events).

Assume that a List B (list of potential customers who like sports) has an action based rule associated with it that causes an entity to be added to list C (list of entities to receive free baseball tickets).

Assume that a List A (list of potential customers who expressed interest in discount sports tickets) has an action based rule associated with it that adds the entity to List B (list of potential customers who like sports).

In the beginning, a given entity named "Gordon" is on Lists D and E. Gordon is contacted by a salesperson responsible for contacting everyone on List D, and the salesperson determines that, based on Gordon's interest, Gordon should be classified as someone who is, in fact, interested in discount sports tickets. So, the salesperson brings up a data record for Gordon and changes his customer information to reflect this. What happens next?

By adding information to Gordon's record that he may be interested in discount sports tickets, the salesperson causes Gordon to be added to List A. By following the above rules, adding Gordon to List A effectively adds him to Lists B, C, and D as well, and removes Gordon from List E (in other words, Gordon is added back to the list of leads to be called for special ticket offers). Gordon is almost exactly back where he started, but with free baseball tickets and the opportunity to receive more (however, Gordon has been removed, likely permanently, from List E of leads who haven't received free sporting tickets).

Figure 11:
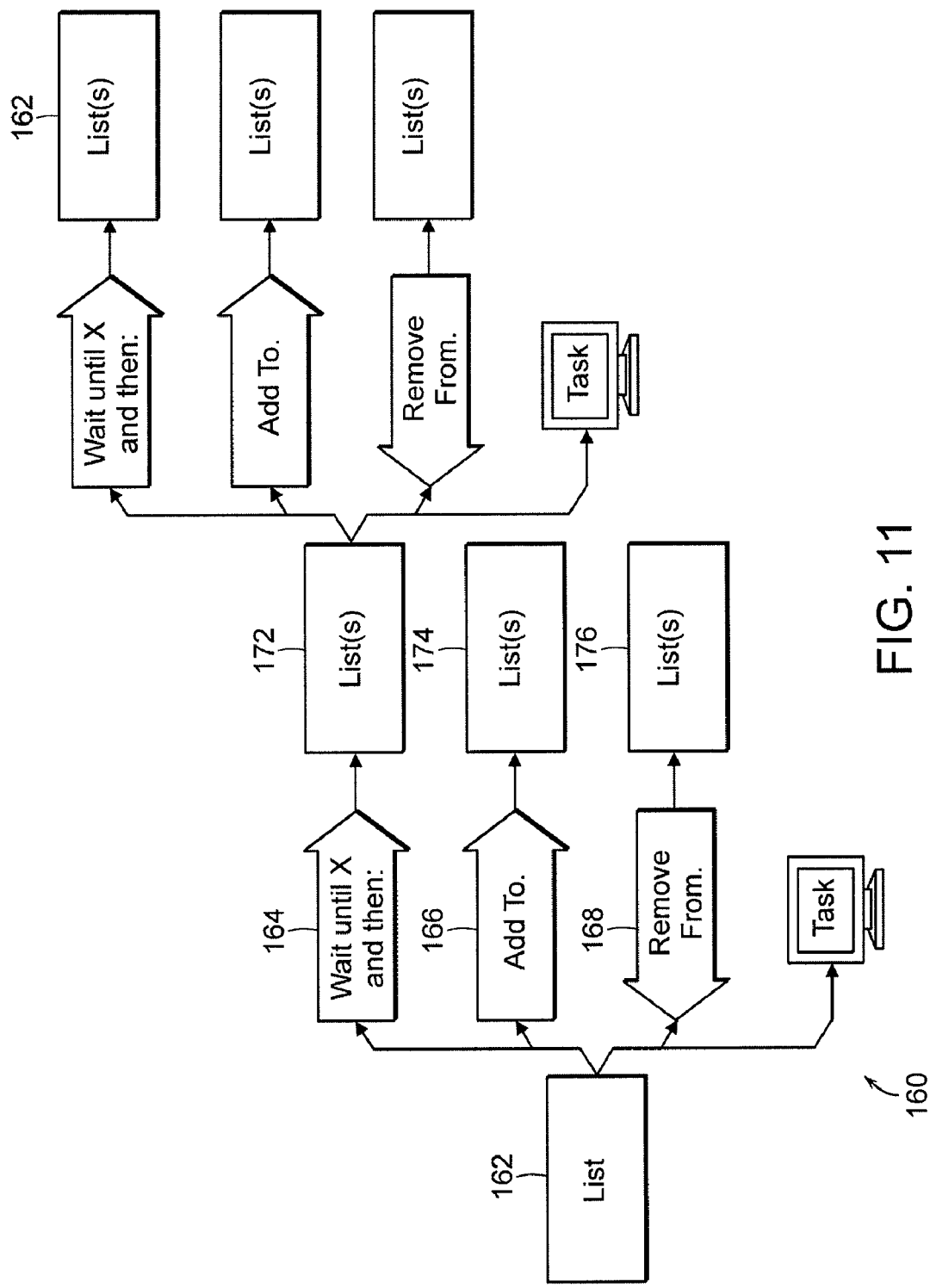
FIG. 11 is a flow diagram illustrating the recursive features of the lists of one embodiment of the invention.

FIG. 11 is a flow diagram further illustrating the recursive features of lists in connection with an example using time-based rules. The rules set 160 of FIG. 11 shows that List 162 has a time-based rule associated with it that, after time period X, adds entities now on List 162 to List 172. List 172 similarly has a time based rule that, after time period X, adds entities on List 172 to List 162 (again). In this example, it is possible for an entity to continuously loop between Lists 172 and List 162 until some other condition (not shown) causes the entity to be removed from either List 172 and/or List 162.

Another aspect of the List 116 of the present invention is that, in one embodiment, each List 116 is capable of having its own meta-data capabilities. Membership on a List 116 thus can carry a set of information along with that membership, although the information is not necessarily part of the data structure of the List 116. Permitting meta-data is important when migrating from legacy systems.

As the above-described applications of the rules show, the list-based data model of the present invention is dynamic, extremely flexible, and has built-in intelligence. The lists of the present invention can be applied to marketing campaigns, sales campaigns, employer training, hiring and review, processing insurance claims—virtually any situation capable of being defined by a process or a series of steps or states. Because of the rules and optional history tracking, Lists are self-monitoring, self-logging, and contain a critical time identification. Thus, any permutation in a business process that is implemented using the list-based data model of the present invention can be easily calculated, graphed, and reported, as each add or delete is retained and time stamped. Such a business process implemented in accordance with the present invention can be thought of as having a running audit trail that records the transition from one field value to another.

For example, a marketer might want to know how long it takes people to move from Lead to Suspect to Prospect, etc., and how long they remain at each stage. Using the present invention, the marketer can test the effect of various offers at each stage in order to determine the optimal strategy. They might ask, what happens to our sales cycle if I change the price from $49 to $79? Does this reduce the flow of people through the cycle? At which stage? What effect does this have on converting people to the Customer stage? Am I better off at the $79 price level, or even a higher price?

In contrast, prior art data models, such as field-based data models, do not offer such advantages, because the number of possible permutations makes it prohibitive to track all possible metrics (e.g. time between step 1 and 2, 1 and 3, 1 and 4, 2 and 3, 2 and 4 etc.) in a field-based data model. This is partly because each data element would need to be designed into the database scheme and directly referenced at various points in the process or applicable business rule. Any additions or changes to field elements would likely require re-programming of the data table, work flow and or business rules that reference these design elements. With the list-based approach of the present invention, however, measuring time changes between lists is not difficult. As the above examples demonstrate, changes in "conventional" field values are, in the present invention, self-administrating objects.

The list-based data model of the present invention also permits metrics to be gleaned that would be unobtainable from a traditional field-based model. Trend analysis, business rules, isolated test marketing all become an easy configuration task. In the traditional field-based model, metrics and business rules are difficult and complex to program, integrate, validate, track and administer. Changes to the model add significant complexity to the programmer's effort. Moreover, different companies within the same vertical market may employ different process steps representing a variety of purposes and consequences, actions and reactions that, in turn, may initiate other processes, making it necessary for a provider of systems and software for automating business processes to have to customize the application for each customer.

In the list-based workflow model possible with the present invention, however, data elements are represented as "smart" list objects, which can be independently added or modified without the need for re-programming or re-defining the underlying system. Additionally, the lists can serve as individual containers, each with its own set of business rules and each capable of producing a variety of metrics for reporting, analysis and automated workflow. When used in combination with other lists the permutations and possibilities become endless. For example, the list-based data model can be combined with a minimal amount of external code to accomplish functions similar to more complicated software programs, such as automating a business process.

Figure 12:
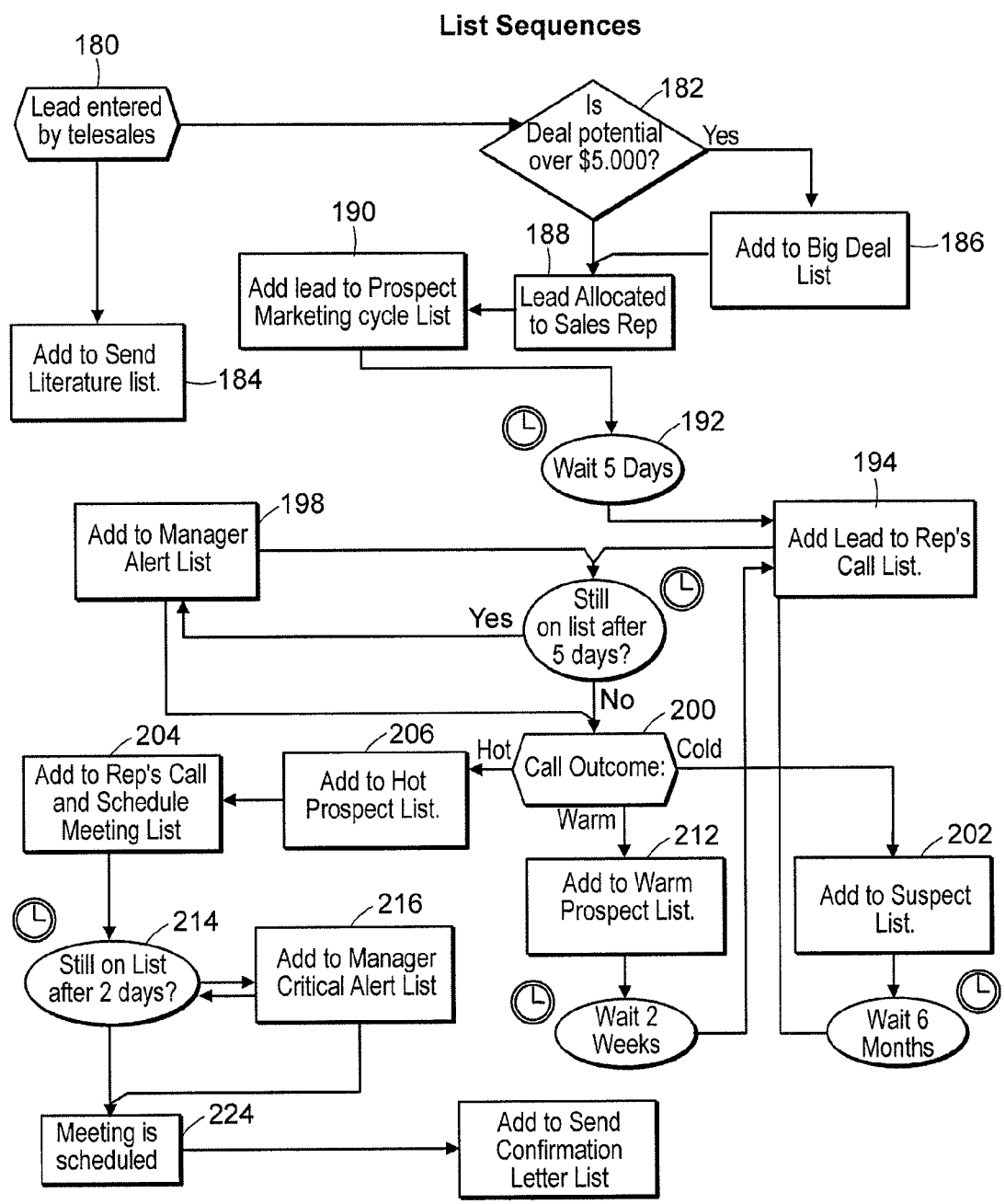
FIG. 12 is a flow chart illustrating how the lists can automate a business process from start to finish, in accordance with one embodiment of the invention.
Figure 13:
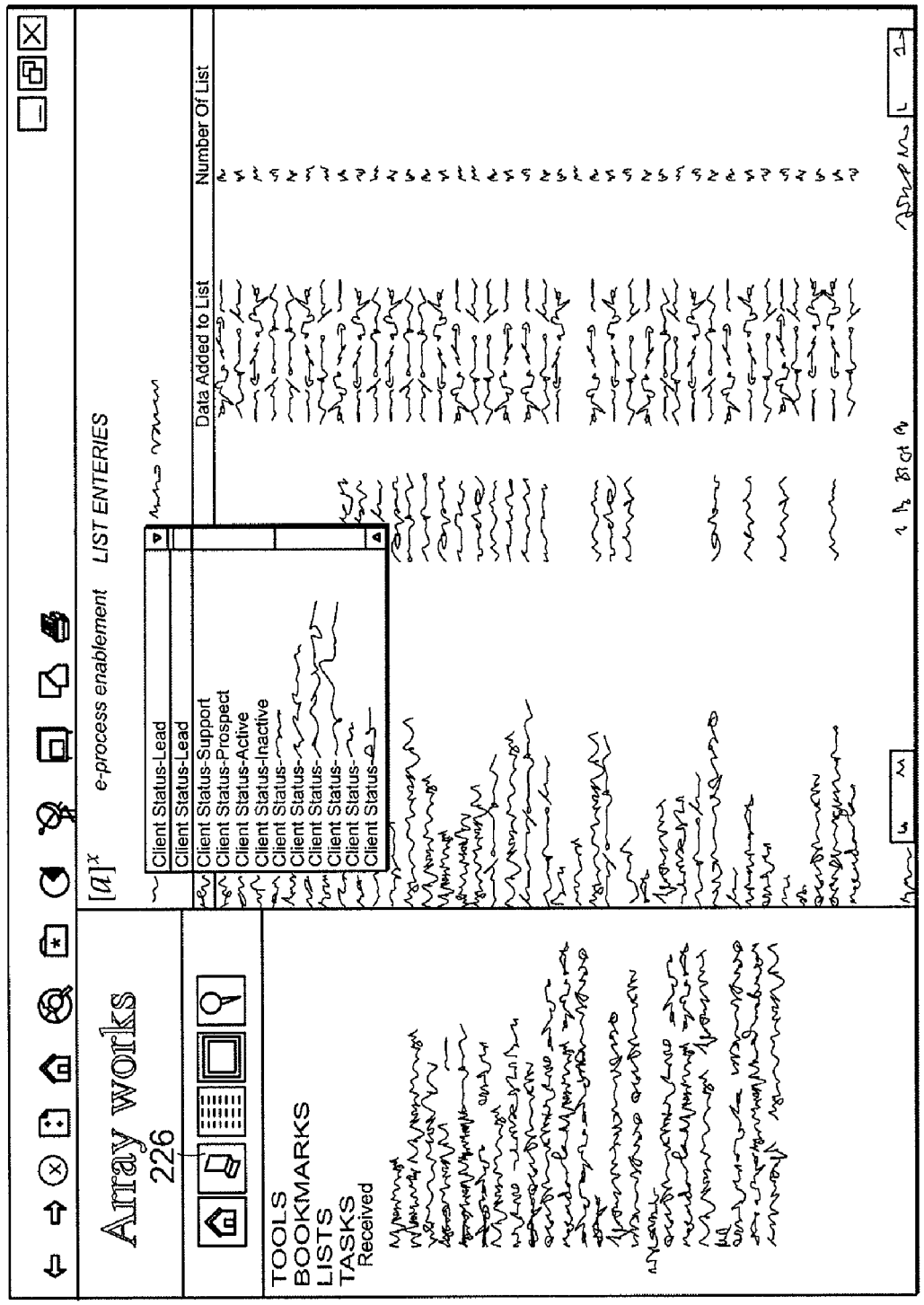
FIG. 13 is a representative example of a graphical user interface used in accordance with one embodiment of the invention.

FIG. 12 is a flow chart illustrating how the lists of the present invention can be used to almost completely automate a business process from start to finish, in accordance with one embodiment of the invention. In FIG. 12, a computer program embodying the present invention would be running at a server (FIG. 5) accessible to a user, such as a telesalesperson, via a graphical user interface (GUI) capable of displaying a list view, such as the list view 224 shown in the GUI of FIG. 13 (which is brought up using a List View button 226). Referring to FIGS. 12 and 13, when Telesales enters a lead (step 180), the lead is added, either manually by the Telesales person or automatically, to a Send Literature List (step 181), and the value of the deal potential is assessed (step 182). The assessment of value can be done in several different ways, in accordance with the invention. For example, it can be done manually, can be done by a customized software running at either the client or the server, or, in one embodiment, can be done by another list implementing a "criteria-based" rule capable of checking other lists to determine actions that must be taken. That is, in accordance with one embodiment of the invention, a "scanning" list can exist that is capable of checking other lists and, based on action and/or time-based rules associated with the "scanning list," take some action on an entity on a different Referring again to FIG. 12, after the value of the deal potential is assessed (step 182), the lists and rules associated with them will accomplish every other step in the business process. can happen automatically, without any user intervention or action, by virtue of the rules associated with the lists. Because many of the types of rules shown in FIG. 12 are similar to rules described previously, explanation is not given.

Figure 14:
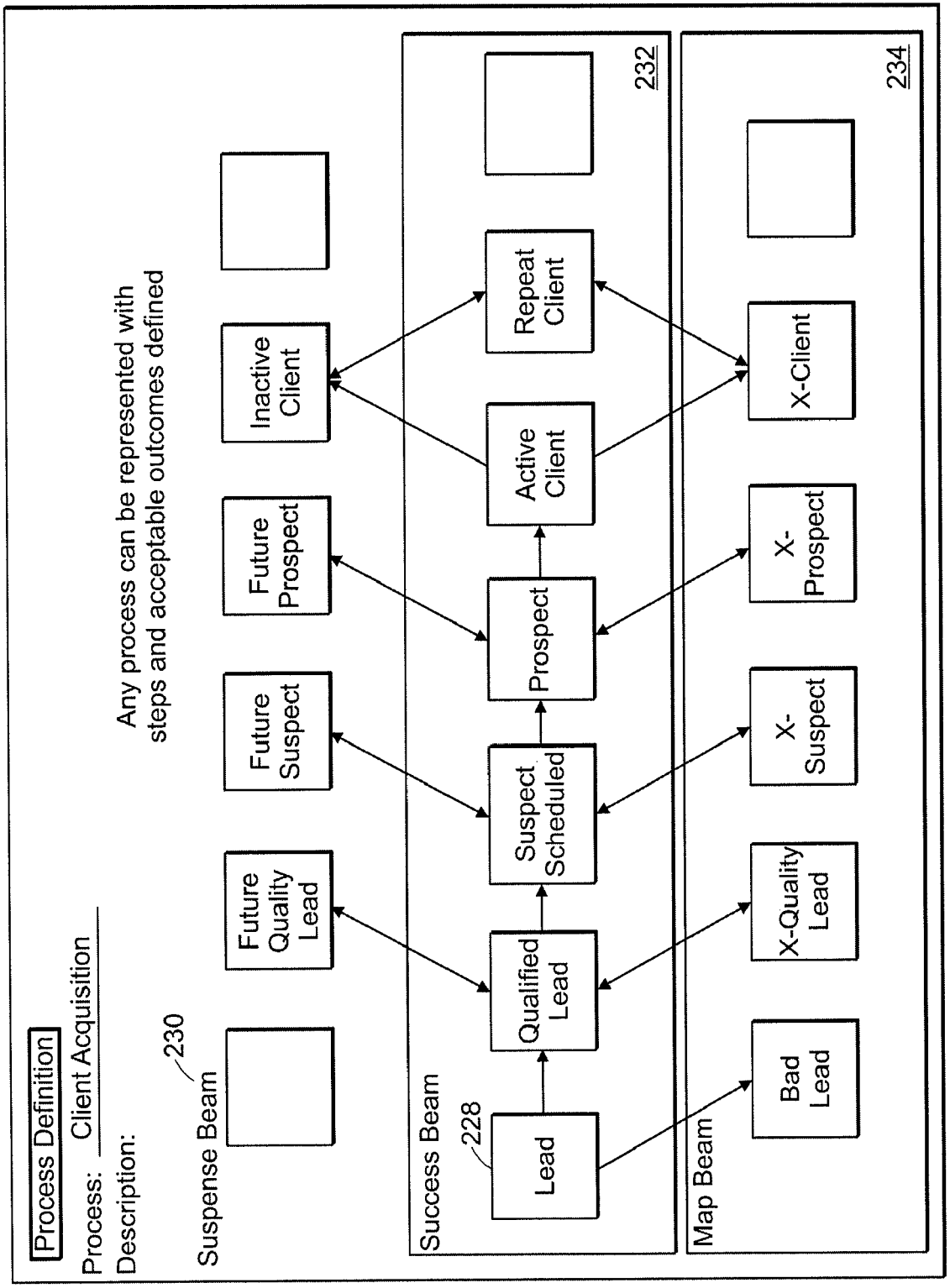
FIG. 14 is a diagram illustrating a set of steps representing a process that can be modeled using one embodiment of the present invention.

FIGS. 14 through 16C are diagrams illustrating how a business process can be translated to a set of Lists 116 and associated rules, in accordance with one embodiment of the invention. FIG. 14 is a diagram illustrating the sets of steps 228 in a representative process, which, like any process, can be represented with steps and acceptable outcomes defined. In the process represented in FIG. 14, the steps 228 and outcomes are further classified as belonging to a Suspense Beam 230, a Success Beam 228, or a Stop Beam 234. At each step 228, the next step in the process that may occur may come from another beam or the same beam. For example, following the step Lead on the Success Beam 232, the next possible outcomes are Bad Lead on the Stop Beam 234 or Qualified Lead on the Success Beam 232. It can be seen in this example process that most of the steps 228 on the Stop Beam 234 are "dead end" steps with the exception of X-Client, and that most of the steps 228 on the Suspense beam likewise are "ending" steps with the exception of Inactive Client.

Figure 15:
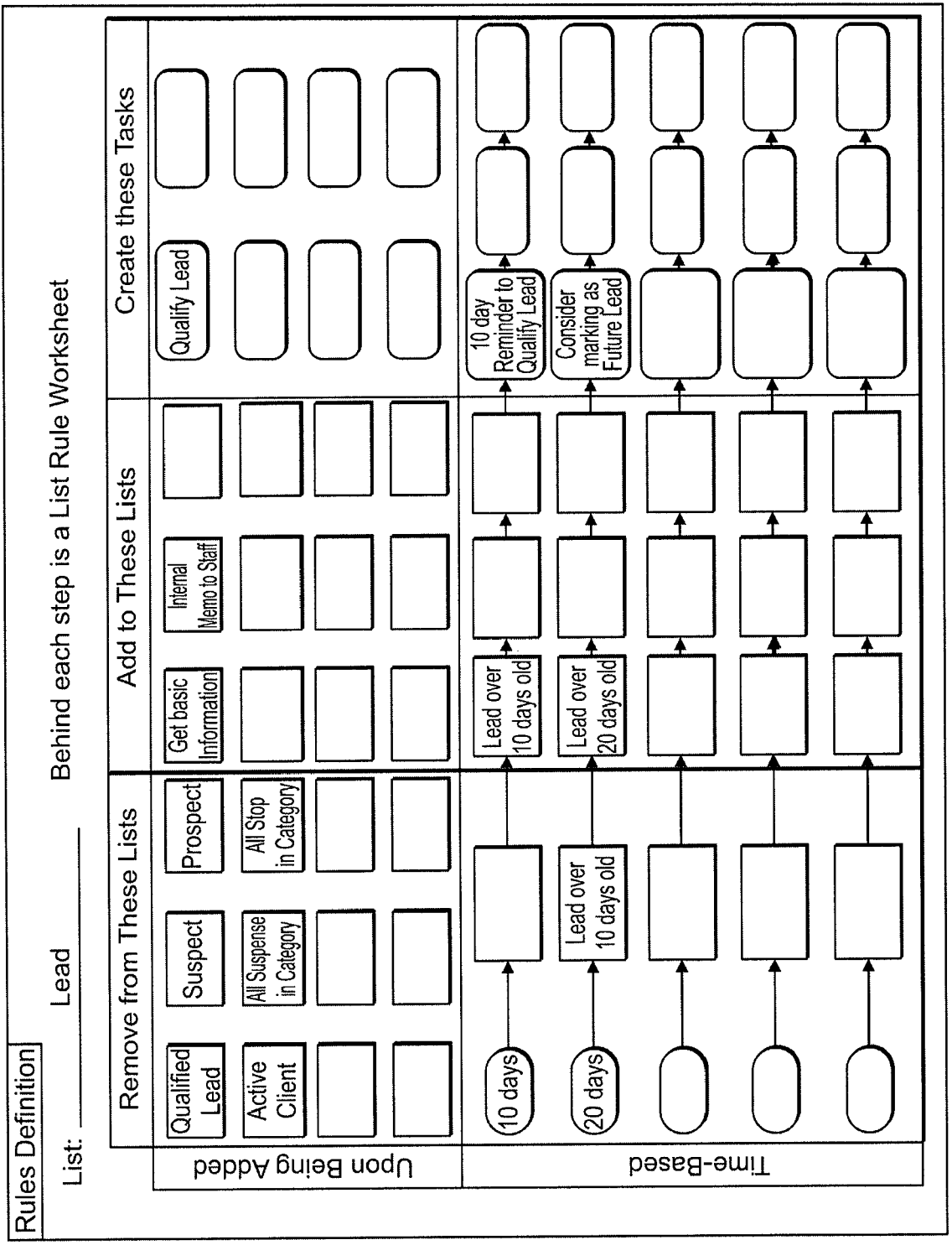
FIG. 15 is diagram providing a representative example of the types of rules that may be associated with a given step in the process of FIG. 14.
Figure 16A:
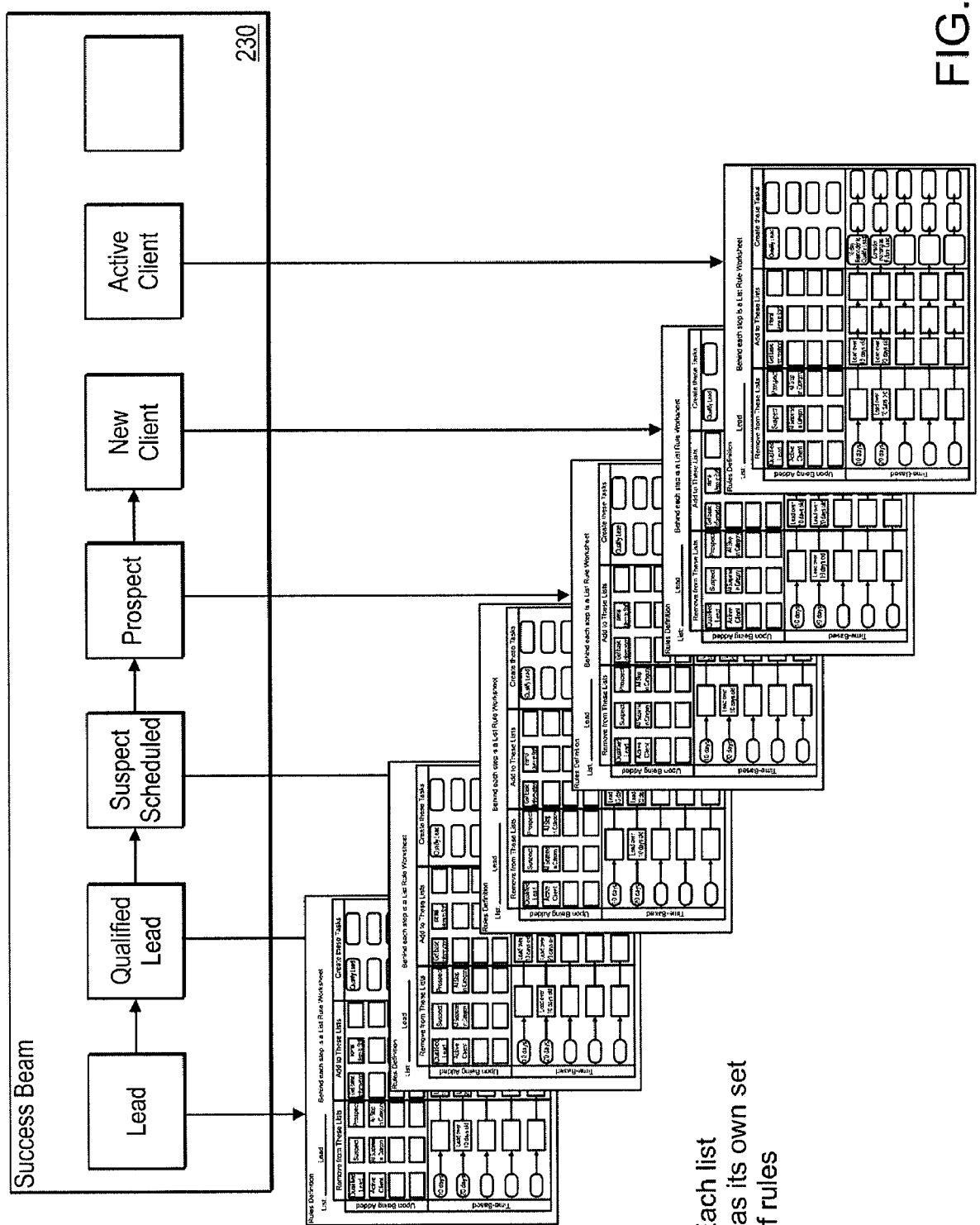
FIGS. 16A through 16C are diagrams illustrating the respective rule sets associated with the list that corresponds to each step in the process of FIG. 14.
Figure 16B:
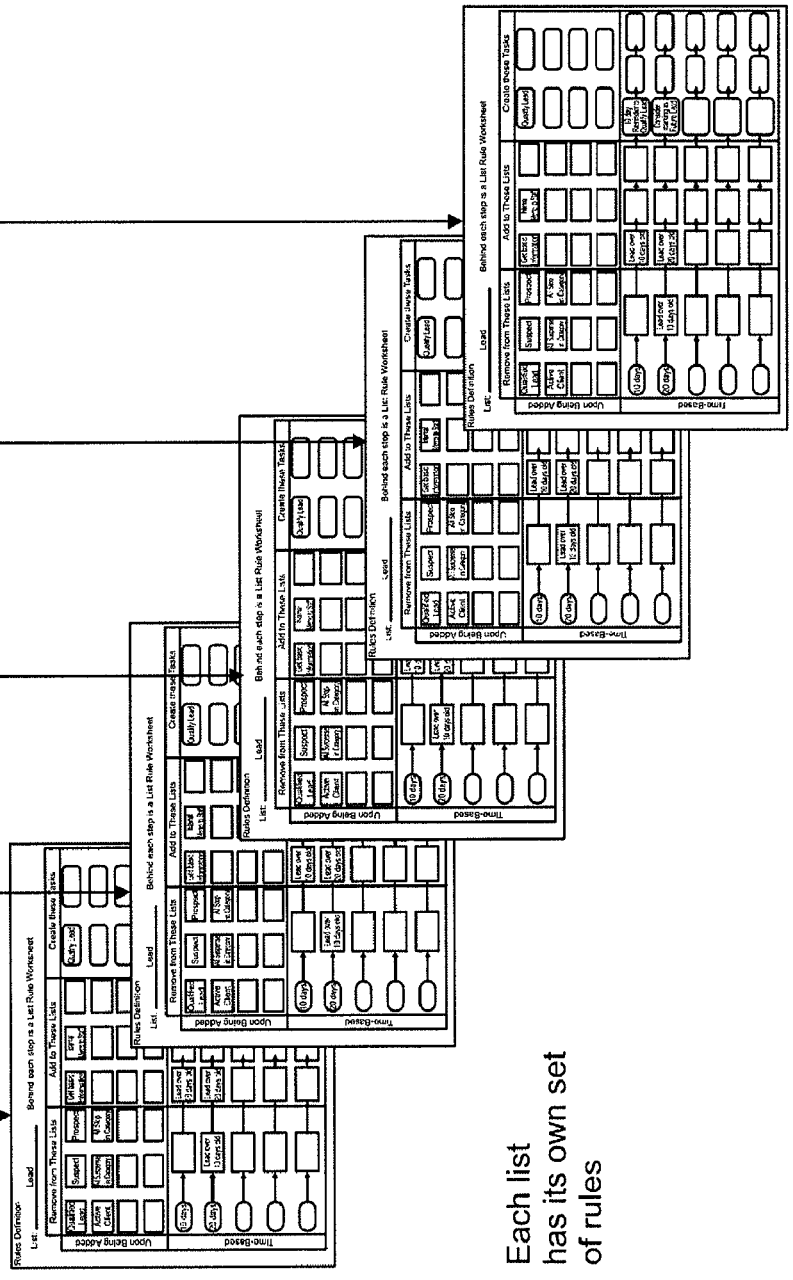
Figure 16C:
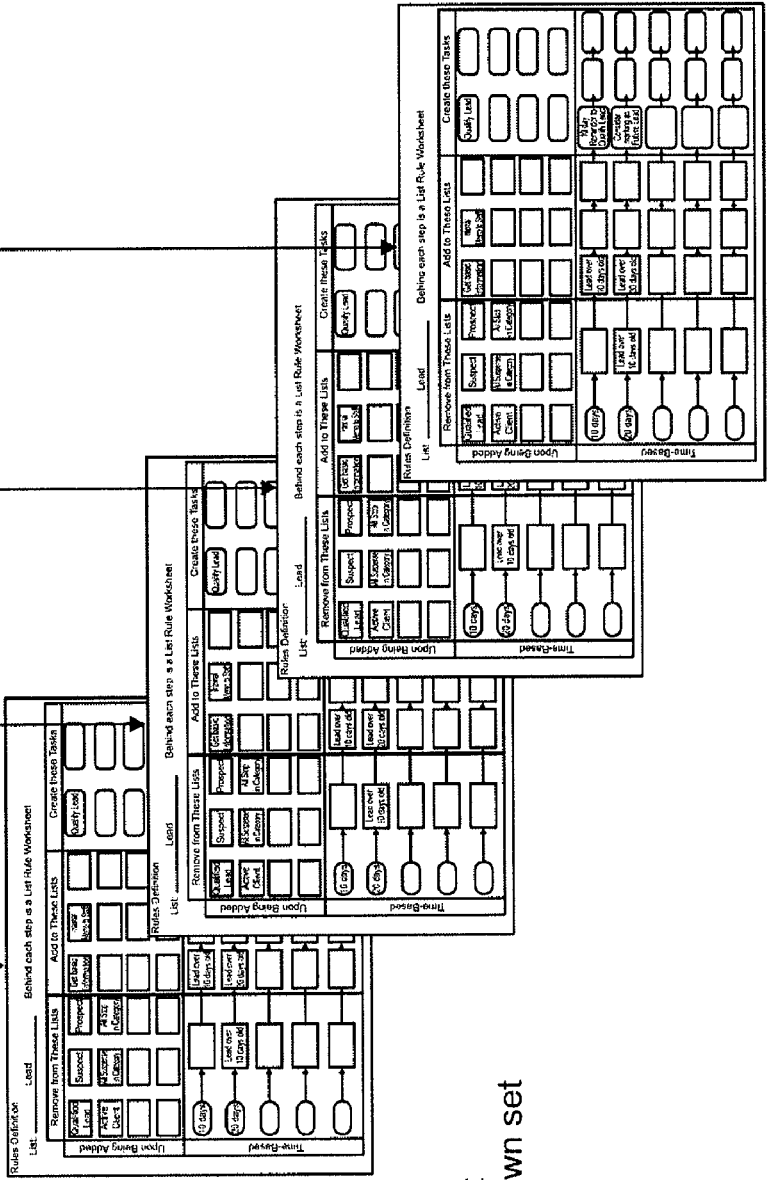

Each step 228 in the process of FIG. 14 can be viewed as a step 228 (also referred to as state) in which a given entity, such as a person, may be at any time during the process. Thus, each step 228 can be represented by a list, and the next steps and/or possible outcomes represented in FIG. 14 can be embodied in a set of rules associated with each list. FIG. 15 is diagram providing a representative example of the types of rules that may be associated with a given step in the process of FIG. 14. For example, FIG. 15 shows the list rules associated with the step Lead of FIG. 14. Similarly, each other step 228 in the process of FIG. 14 is associated with a respective list having its own set of rules (see FIGS. 16A through 16C).

Figure 17A:
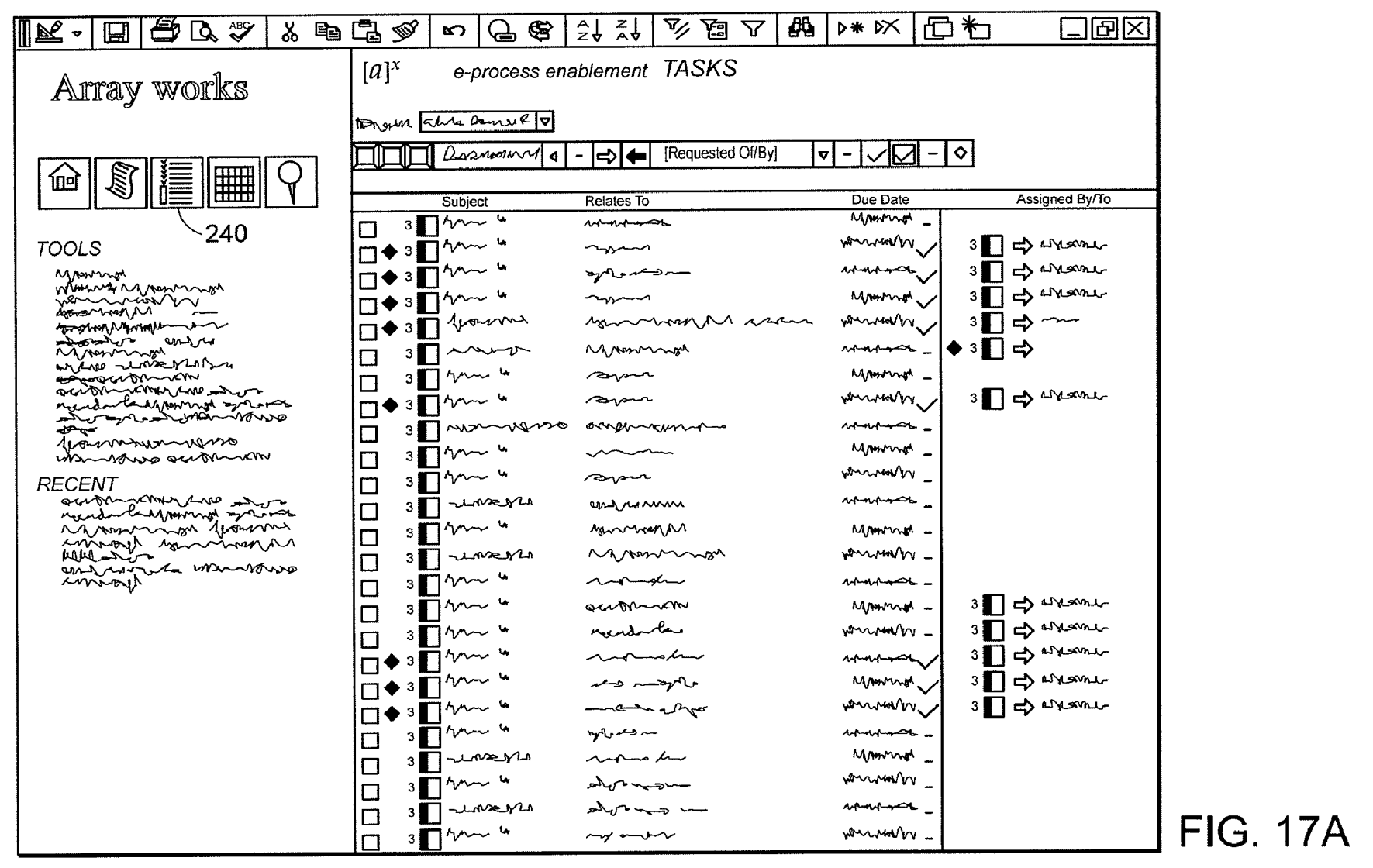
Figure 17B:
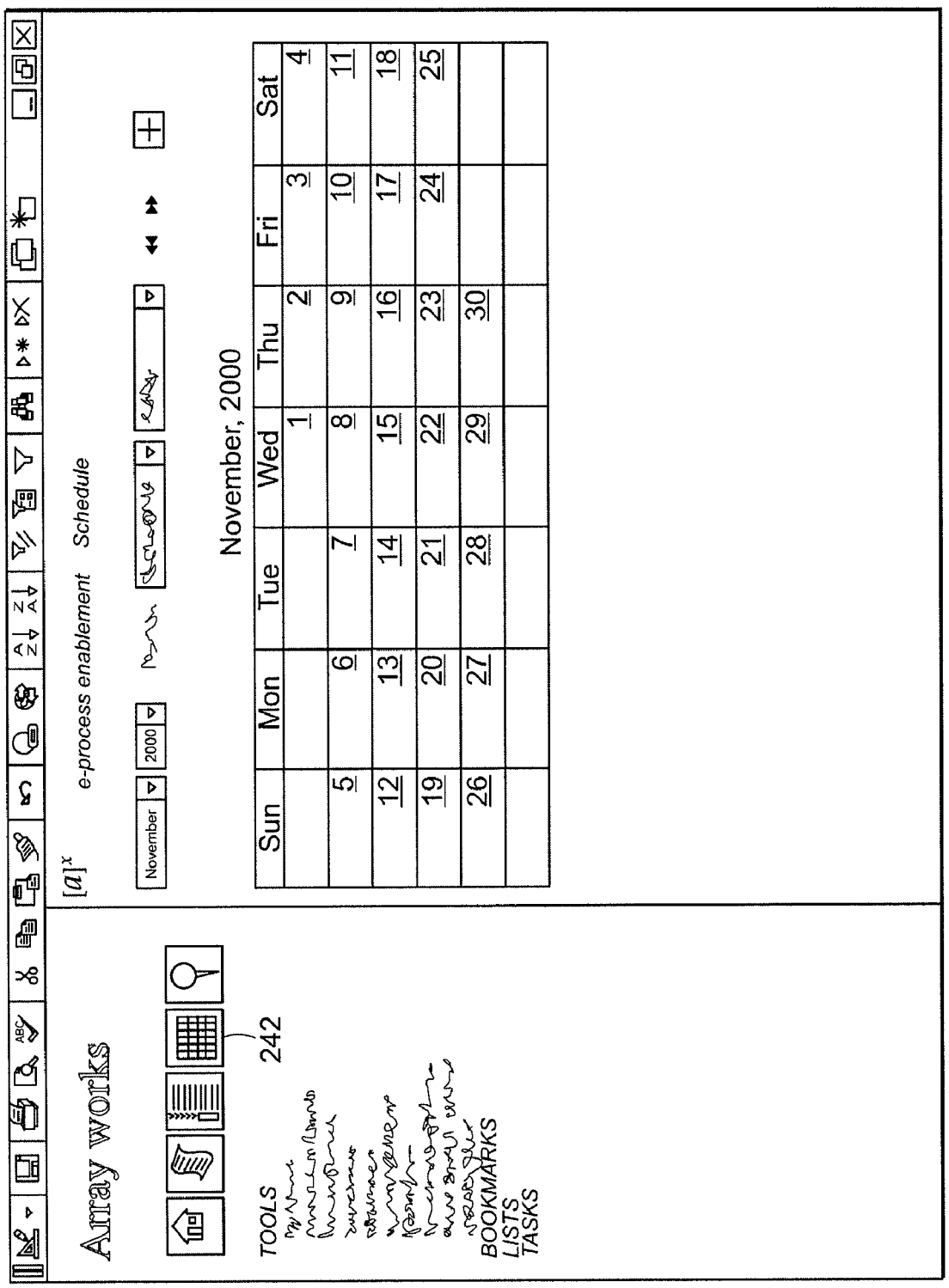
Figure 17C:
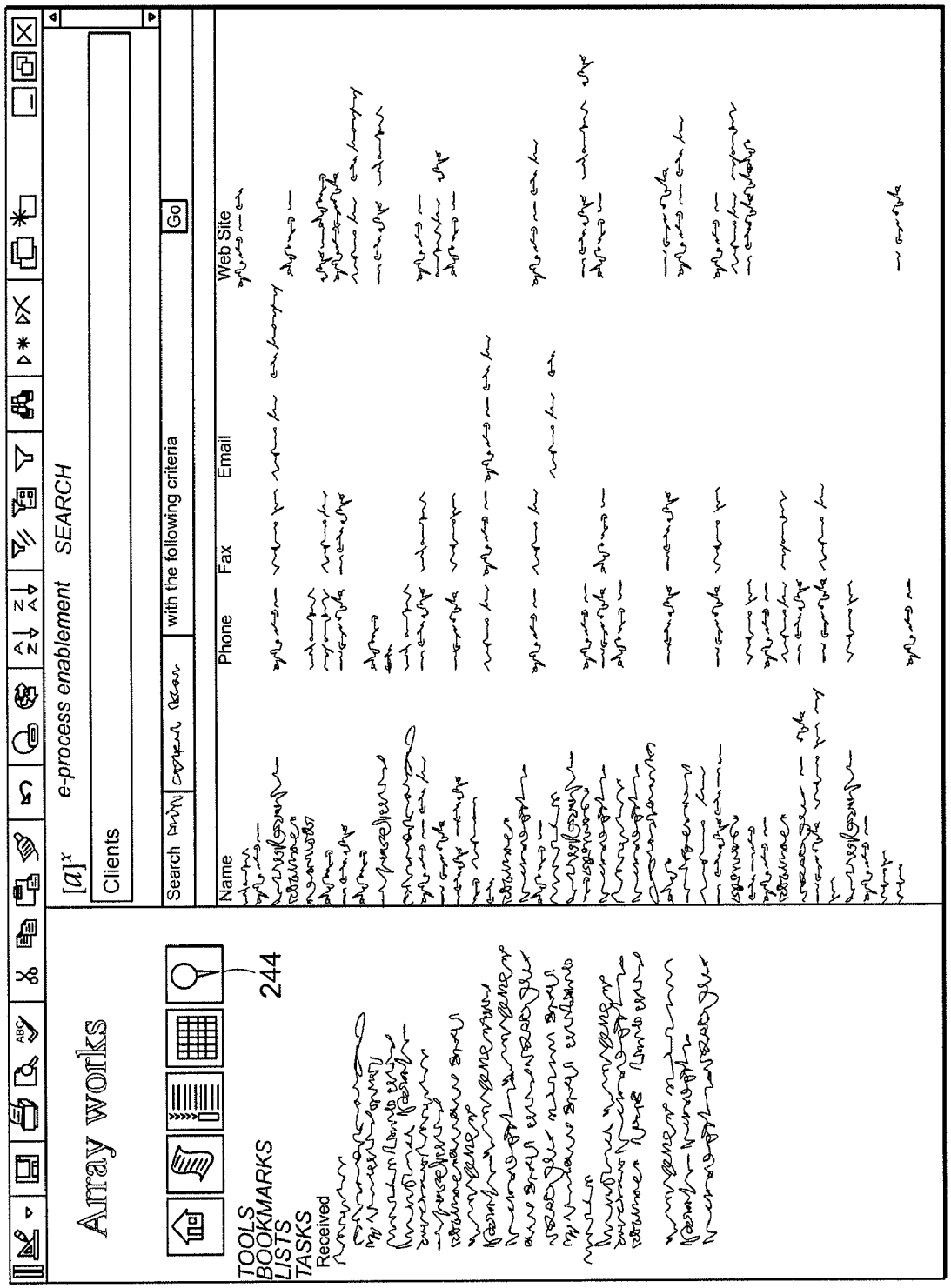

FIGS. 17A through 17C illustrate representative screen shots of some parts of the GUI interface to a system 50 (see FIG. 4) as implemented in accordance with one embodiment of the invention. FIG. 17A is a representative example of the Task View (accessible using the Task View button 240), FIG. 17B is a representative example of an Event Calendar (accessible using the Event Calendar button 242), and FIG. 17C is a representative example of Search Engine View (accessible using the Search Engine button 244).

Figure 18:
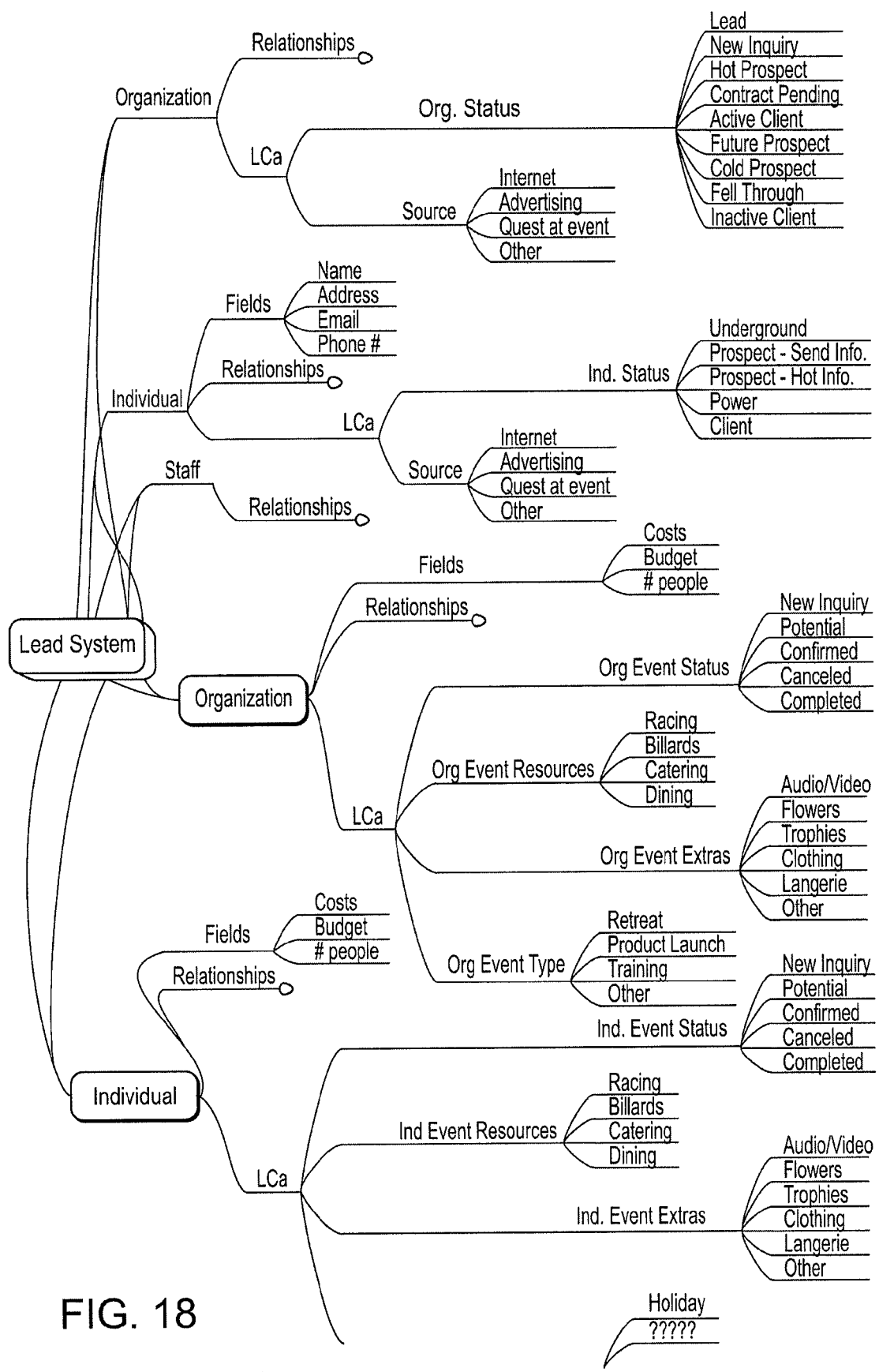
FIG. 18 is a representative example of Company Specific System Parameters for the system of FIG. 4.

FIG. 18 is a representative example of Company Specific System Parameters 54 (see FIG. 4) for a business that might use the system of the invention. In this example, the business is involved in event planning, and the parameters illustrated help to define how the data structures described herein can be tailored to the needs of the business. For example, the parameters in FIG. 18 show that for an Organizational Event, the Event Resources include Racing, Billiards, Catering, and Dining; Event Types include Retreat, Product Launch, Training, and Other; and the Event Status can be New Inquiry, Potential, Confirmed, Canceled, and Completed. This illustrates, for example, that the entities of the invention are not just persons, but also can be things or places (including resources such as Billiards) that help to accomplish the high-level transaction (i.e., planning an event) for an organization.

In another example, FIG. 18 illustrates that an Event such as a Product Launch can, for this organization, be described by a business process with the states New Inquiry, Potential, Confirmed, Canceled, and Completed. Accordingly, the list-based model for management of business processes, as embodied in the present invention, can be used to track and manage the planning of the Product Launch through each of its states. Moreover, as explained below, in another aspect, the present invention also can be used to manage and track the implementation of these steps at the task level.

Another aspect of the present invention involves the applicability of the list data models to task management. Recall also that, in accordance with the invention, action and time based rules for lists can create Tasks 88, such as upon occurrence of a specific event related to a List 116 (such as an Entity 82 or entity/transaction pair being added to or removed from one or more lists). Creation of Tasks 88, in accordance with the invention, also can result in email notifications relating to the Task being sent to appropriate Entities 82, such as the entity responsible for accomplishing the task and the entity responsible for overseeing the task (or even to other non-Entity persons or organizations, if applicable). Another aspect of the present invention provides a system for management of such tasks by providing tools to enable individual action on tasks and accountability for them.

Figure 19C:
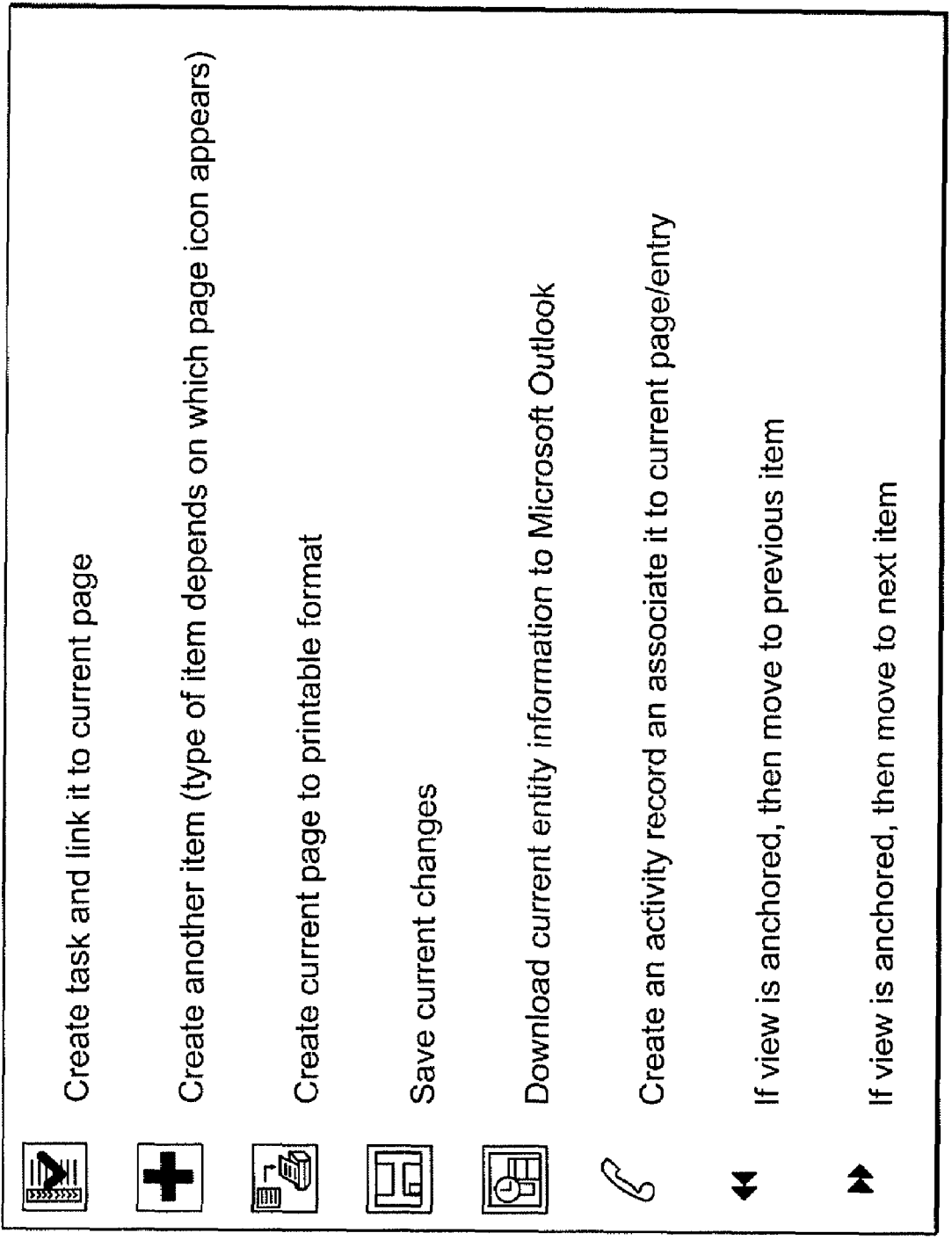

Tasks 88 fall into three categories: those that are self generated, system generated or delegated (e.g., delegated by someone or delegated to someone). Tasks 88 can also be sub-delegated (a task delegated to a first person can be further delegated by that first person to a second person). As discussed previously, the Tasks 88 (see FIG. 5) of the data model 80 of the present invention can be used, in combination with the list functionality, to provide a system whereby the Entities responsible for delegating, managing, or performing a task can track the delegation, management, or performance of the task FIG. 19A is a representative screen shot illustrating a summary page of a task management system implemented in accordance with one embodiment of the invention, and FIGS. 19B-19C are legends explaining the meaning of icons found in the screen shots of this embodiment (including FIG. 19A). In the example screen shot of FIG. 19A, only tasks that have not been completed are shown (tasks that have been completed have been filtered out, which is another feature of this embodiment). The examples described herein, in connection with the screen shots, illustrate how the task management system of the invention can improve the tracking and management of work assigned and work received.

The screen shot of FIG. 19A (when read in conjunction with the legends of FIGS. 19B-19C) tells much about the responsibilities of an individual named "Chris Long," including work assigned to and received from an individual named "Karen Quast." For example, looking at the first line under "Subject," and "Relates to," it can be seen that Chris Long has a task relating to "Cardinal Distributors" to "Karen Quast," who has received the task and has had it for two days. Another line within the screen shot of FIG. 19A also shows a task with a subject of "Please follow up to mailing" associated with "Abington Savings Bank". The information for this task shows that Karen Quast has completed the task and that the task is waiting for signoff.

Because the task management of this system is accomplished using the list-based data model described above, it is possible (using, for example, the time-stamp feature) to determine that Karen Quast has had the task for two days. The list-based model of the present invention also can have a role in how the task is assigned to Ms. Quast. The task could have been assigned to Ms. Quast in several ways. For example, the task of course could be assigned manually (i.e., directly by Chris Long to her, without lists) but the task also could have been automatically sent to Ms. Quast because of the triggering of some action or time-based rule associated with a list. The list could be directly related to a business process to which Ms. Quast and/or Mr. Long is a related entity, or the list could be independent of a business process and related to marketing and/or demographic information.

Another aspect of task management, in accordance with one embodiment of the invention, is that rules can be associated with tasks (in a manner similar to the previously-described action and time-based rules for list). The task rules can, for example, associate the completion of a task with another type of action. For example, referring to FIG. 19A, Karen Quast's completion of the task of following up to the mailing to Abington Savings Bank may trigger a task being assigned to, for example, Chris Long, such as the task of sending a second mailing (or delegating the task of sending a second mailing). A task also could have a rule associated with it providing that completion of a task triggers movement to another step or state in the business process, or providing that completion of a given task indicates that a Transaction (see previous discussion) actually is completed.

It should be understood, in addition, that the task management aspect of the present invention is not limited to managing tasks that have outcomes of "Completed" or "Not Yet Completed." In some instances, such as cold-calling a potential customer, a task may have different acceptable outcomes, such as "Customer wants further information," "Customer wants to speak with an Application Engineer," or "Customer wants us to call back in three weeks." Accordingly, in one embodiment, the present invention provides task rules that trigger actions depending on the outcome of the task.

The screen shot of FIG. 19A contains much more information, which can be understood by referring to the related legends in FIGS. 19B and 19C.

Figure 20:
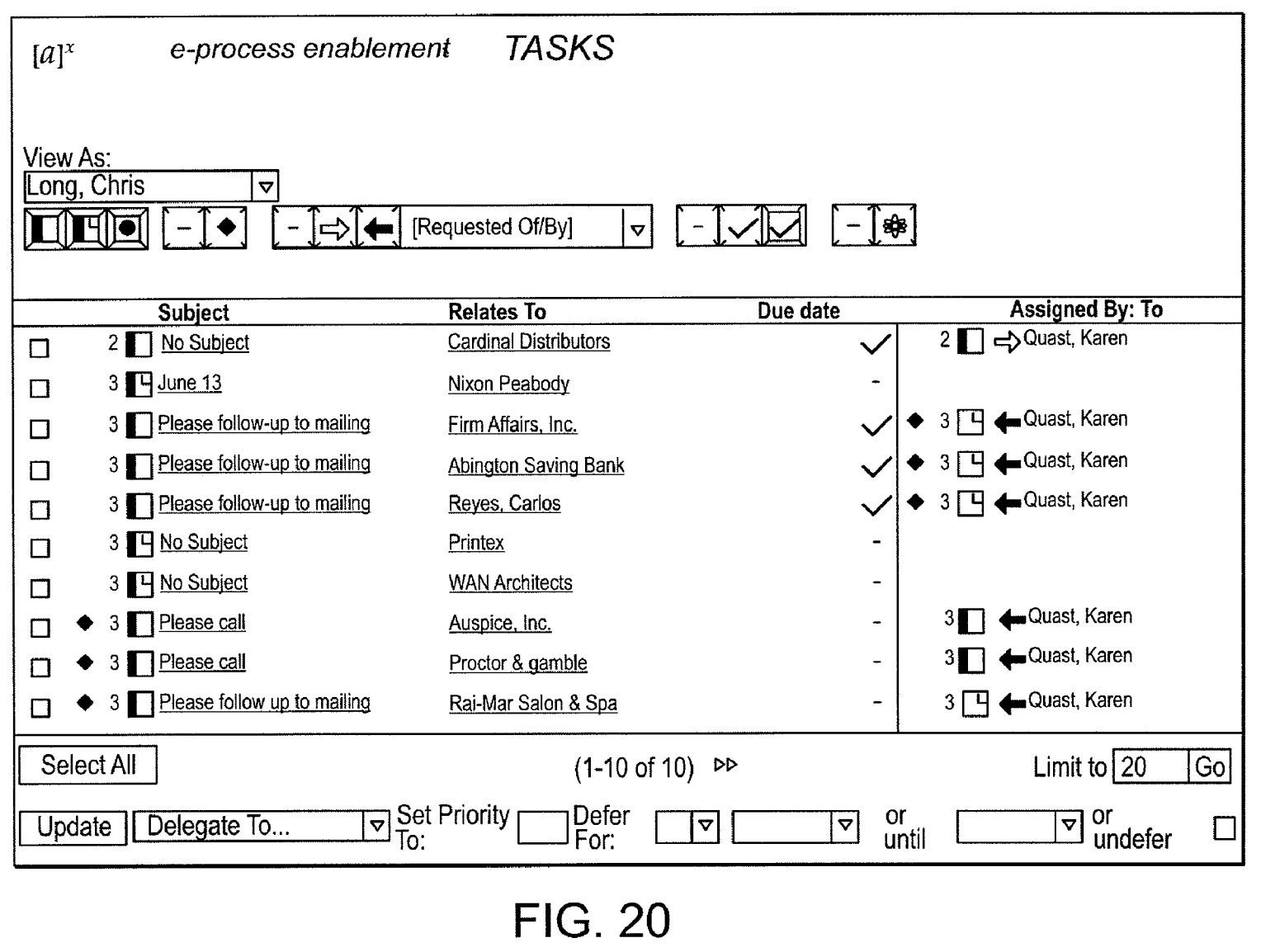

FIG. 20 is a representative screen shot showing another view of the screen shot of FIG. 19A, with items further filtered by status (in this example, items having a status of "Deferred" have been filtered out of the view), in accordance with one embodiment of the invention.

FIG. 21 is a representative screen shot showing a view of the details of particular tasks assigned to an individual named Richard Piasecki by Karen Quast, showing a history of the comments made to these tasks, in accordance with one embodiment of the invention.

Figure 22:
FIG. 22 is a representative screen shot showing a blank detail page relating to a task, in accordance with one embodiment of the invention.

FIG. 22 is a representative screen shot showing a blank detail page relating to a task, in accordance with one embodiment of the invention. The detail page here shows that details about the task, including the description, due date, and the like, can be inputted manually. Although not illustrated in FIG. 22, in other embodiments of the invention, the detail page relating to a task can include other information, such as knowledge associated with a task. This knowledge can be provided in many different ways, such as by manually inputting the information, providing a link (e.g., a hyptertext link) to the information, or attaching further information to the task, such as attaching a file containing a library of knowledge relevant to the task. The knowledge can be associated with the task at the time the task is created or at the time the task is delegated, for example. This "knowledge management" aspect of task management can be particularly helpful in certain industries, such as telephone sales industries, where the "knowledge" included with the task can, for example, be a "script" for telemarketing or cold-calling.

It should be understood, that the illustrative screen shots and associated illustrated features shown herein are provided by way of example only. Those skilled in the art will recognize that many different types of web sites, having many different types of "look and feel" qualities, are intended to be included within the scope of the invention. Those skilled in the art will recognize that many different types of systems and web pages can be designed in accordance with the invention.

Variations, modifications, and other implementations of what is described herein will occur to those of ordinary skill in the art without departing from the spirit and the scope of the invention as claimed. Accordingly, the invention is to be defined not only by the preceding illustrative descriptions and drawings but also from the claims.

What is claimed is:

1. A computerized method of managing business data, comprising:
   maintaining a database with a data architecture comprising:
   an entity schema including an entity table, an entity relationships table, a lookup table of entity types, and a lookup table of entity relationships;
   a transaction schema including a transaction table, and a transaction details table,
   wherein each entry in the transaction table is associated with at least one entry in the entity table;
   a list entities schema including a list entities table, a lookup table of lists, a lookup table of list-to-be-added-to, a lookup table of lists-to-be-removed-from, and a lookup table of list tasks-to-add, a lookup table of list cycle-steps, a lookup table of list cycle-steps-lists-to-add-to, a lookup table of list cycle-steps-list-to-remove-from, a lookup table of list cycle-step-tasks-to-add,
wherein the entries in the list entities table represent the information associated with the entries in the entity table and each entry on the list entities table is associated to an entry in the lookup table of lists;
a tasks table, wherein each entry on the tasks table is associated with at least one entry in the entity table;
applying an action-based rule when an entry is added to the list entities table; controlling a display device to display at least one entry from the tasks table in relation to at least one entry in the entity table;
scanning the entries on the list entities table on a periodic basis;
determining the length of time each entry has existed in the list entries table; and
applying a time based rule if the length of time for an entry exceeds a predetermined value.

2. The method of claim 1 wherein each entry on the tasks table is associated with at least one entry in the transaction table.

3. The method claim 1 wherein the business data represents a business process which includes a plurality of steps, and the entries in the list entities table represent acceptable outcomes for each of the steps.

4. The method of claim 1 wherein applying the action-based rule includes adding an entry to the tasks table.

5. The method of claim 1 wherein applying the time based rule includes adding an entry to the tasks table.

6. A computer-readable medium having computer-executable instructions stored upon for performing a method for managing business data comprising:
maintaining a database with a data architecture comprising:
an entity schema including an entity table, an entity relationships table, a lookup table of entity types, and a lookup table of entity relationships;
a transaction schema including a transaction table, and a transaction details table, wherein each entry in the transaction table is associated with at least one entry in the entity table;
a list entities schema including a list entities table, a lookup table of lists, a lookup table of list-to-be-added-to, a lookup table of lists-to-be-removed-from, and a lookup table of list tasks-to-add, a lookup table of list cycle-steps, a lookup table of list cycle-steps-lists-to-add-to, a lookup table of list cycle-steps-list-to-remove-from, a lookup table of list cycle-step-tasks-to-add, wherein the entries in the list entities table represent the information associated with the entries in the entity table and each entry on the list entities table is associated to an entry in the lookup table of lists;
a tasks table, wherein each entry on the tasks table is associated with at least one entry in the entity table;
applying an action-based rule when an entry is added to the list entities table;
controlling a display device to display at least one entry from the tasks table in relation to at least one entry in the entity table;
scanning the entries on the list entities table on a periodic basis;
determining the length of time each entry has existed in the list entries table; and
applying a time based rule if the length of time for an entry exceeds a predetermined value.

7. The computer-readable medium of claim 6 wherein each entry on the tasks table is associated with at least one entry in the transaction table.

8. The computer-readable medium of claim 6 wherein the entries in the list entities table represent acceptable outcomes for each of a plurality of steps in a business process.

9. A computerized system for managing business data comprising:
at least one computer system;
a database component operative to maintain a data architecture comprising:
an entity schema including an entity table, an entity relationships table, a lookup table of entity types, and a lookup table of entity relationships;
a transaction schema including a transaction table, and a transaction details table,
wherein each entry in the transaction table is associated with at least one entry in the entity table;
a list entities schema including a list entities table, a lookup table of lists, a lookup table of list-to-be-added-to, a lookup table of lists-to-be-removed-from, and a lookup table of list tasks-to-add, a lookup table of list cycle-steps, a lookup table of list cycle-steps-lists-to-add-to, a lookup table of list cycle-steps-list-to-remove-from, a lookup table of list cycle-step-tasks-to-add,
wherein the entries in the list entities table represent the information associated with the entries in the entity table and each entry on the list entities table is associated to an entry in the lookup table of lists;
a tasks table, wherein each entry on the tasks table is associated with at least one entry in the entity table;
a rules component operative to apply action-based rules when an entry is added to the list entities table; and
a display component operative to display at least one entry from the tasks table in relation to at least one entry in the entity table;
wherein the rules component is operative to scan the entries on the list entities table on a periodic basis, determine the length of time each entry has existed in the list entries table, and apply a time based rule if the length of time for an entry exceeds a predetermined value.

10. The system of claim 9 wherein the rules component is operative to add an entry to the tasks table.

11. The system of claim 9 wherein the time based rule includes adding an entry to the tasks table.

* * * * *